US012111058B1

(12) United States Patent
Janowski et al.

(10) Patent No.: US 12,111,058 B1
(45) Date of Patent: Oct. 8, 2024

(54) HEATED DOOR GLASS FOR OVEN

(71) Applicant: Sub-Zero Group, Inc., Madison, WI (US)

(72) Inventors: Sebastian Janowski, Madison, WI (US); Michael Wipperfurth, Fitchburg, WI (US)

(73) Assignee: Sub-Zero Group, Inc., Madison, WI (US)

( * ) Notice: Subject to any disclaimer, the term of this patent is extended or adjusted under 35 U.S.C. 154(b) by 0 days.

(21) Appl. No.: 18/228,961

(22) Filed: Aug. 1, 2023

(51) Int. Cl.

| | |
|---|---|
| ***F24C 15/04*** | (2006.01) |
| ***H05B 3/86*** | (2006.01) |
| *H05B 1/02* | (2006.01) |
| *H05B 3/84* | (2006.01) |
| *H05B 6/06* | (2006.01) |

(52) U.S. Cl.

CPC ............... *F24C 15/04* (2013.01); *H05B 3/86* (2013.01); *H05B 1/0263* (2013.01); *H05B 3/84* (2013.01); *H05B 6/06* (2013.01)

(58) Field of Classification Search

CPC ......... F24C 15/04; H05B 3/86; H05B 1/0263; H05B 3/84; H05B 6/06

USPC .......................................................... 126/198

See application file for complete search history.

(56) References Cited

U.S. PATENT DOCUMENTS

| | | | | |
|---|---|---|---|---|
| 2008/0029078 | A1* | 2/2008 | Baumann | F24C 15/045 126/190 |
| 2010/0006086 | A1* | 1/2010 | Iwamoto | F24C 15/327 126/21 R |
| 2016/0360900 | A1* | 12/2016 | Holst | H05B 3/84 |

OTHER PUBLICATIONS

HeatVision, What is electrically Heated Glass? Formator Safety Glass Ltd., 2020; pp. 1-12.

* cited by examiner

*Primary Examiner* — Steven B McAllister
*Assistant Examiner* — Benjamin W Johnson
(74) *Attorney, Agent, or Firm* — Bell & Manning, LLC

(57) ABSTRACT

A controller is provided to operate a glass heater mounted in a door of an oven to heat glass mounted to the door that provides a view into the oven cavity. (A) An indicator of an oven cavity temperature value or an oven temperature setpoint value is received. The oven cavity temperature value indicates a current temperature in an oven cavity, and the oven temperature setpoint value indicates a temperature set point. (B) A voltage value or a current value is determined based on the oven cavity temperature value or the oven temperature setpoint value. (C) The determined voltage value or the determined current value is provided to operate the glass heater. (D) (A) through (C) are repeated until the oven is switched to an off-state or the oven cavity temperature value is greater than or equal to the oven temperature setpoint value.

20 Claims, 35 Drawing Sheets

FIG. 22D
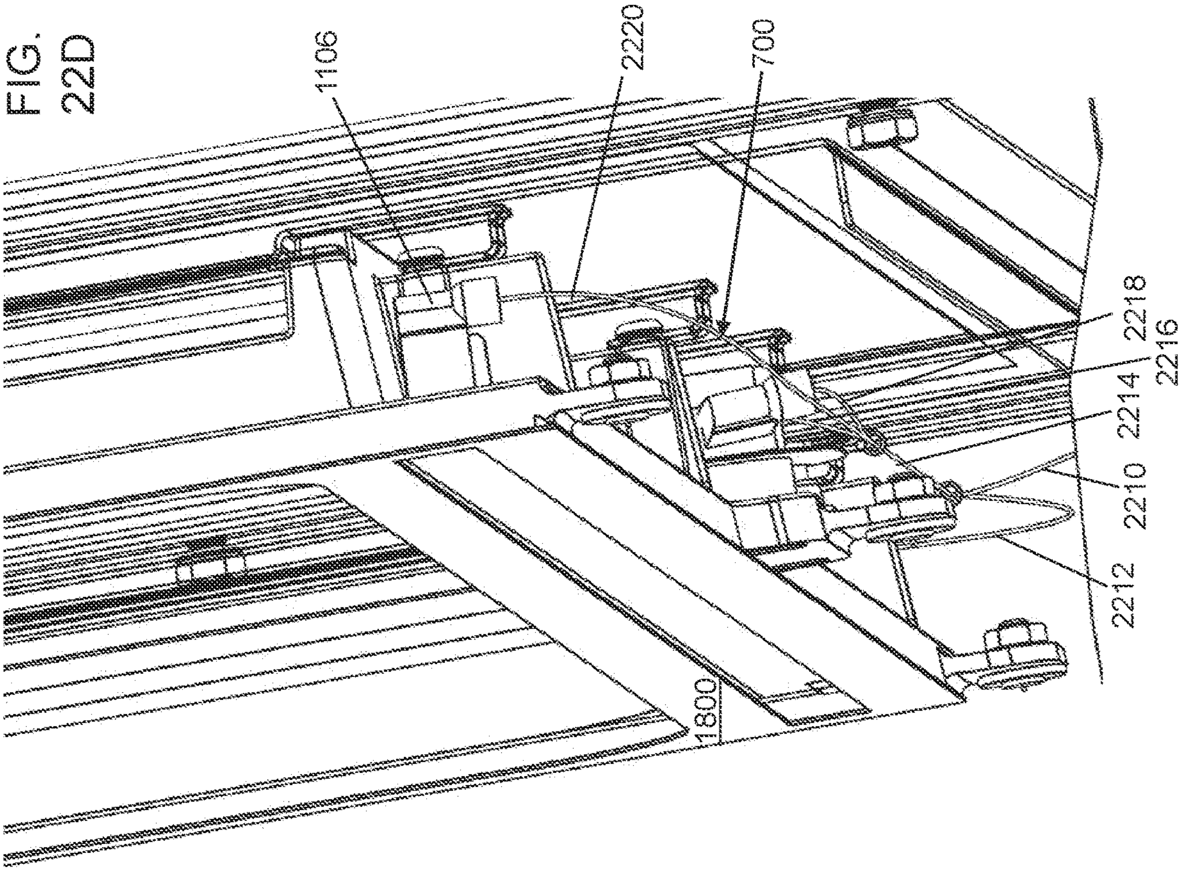
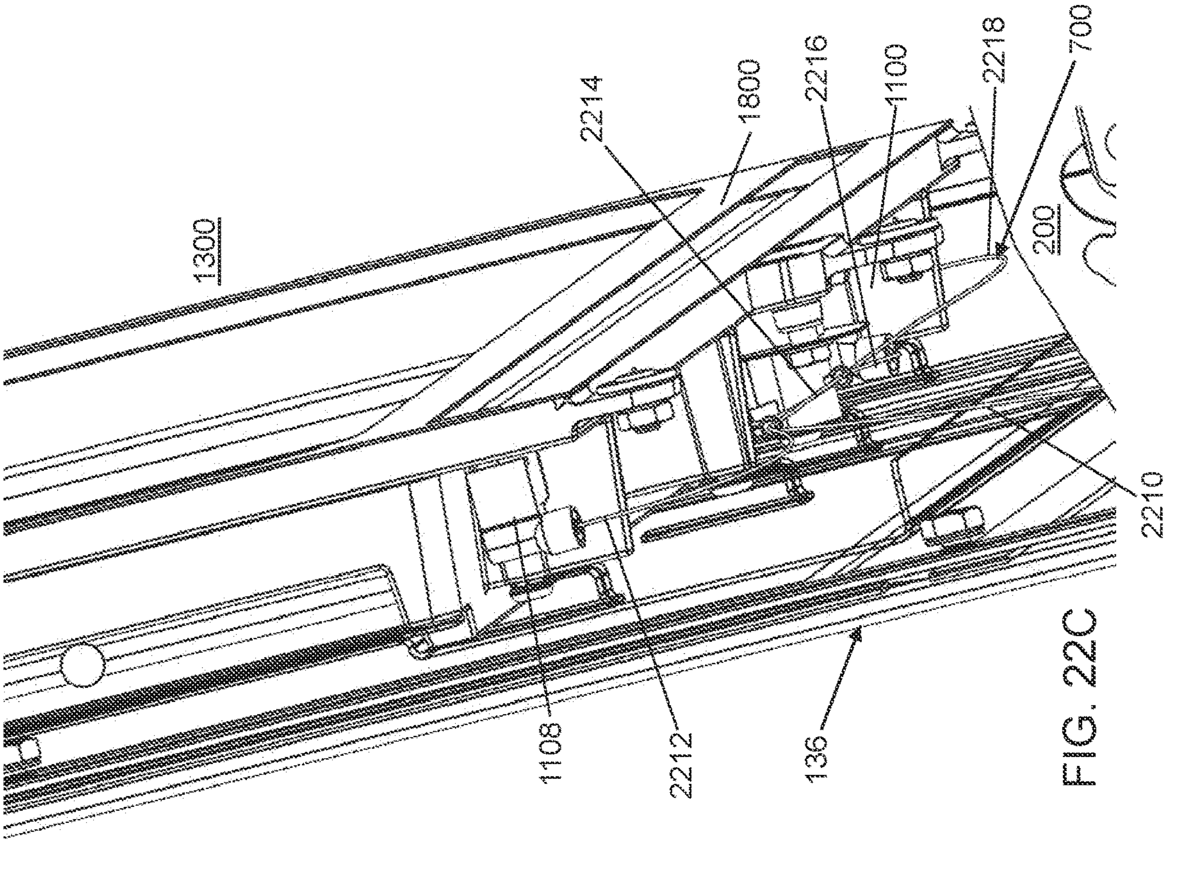
FIG. 22C

HEATED DOOR GLASS FOR OVEN

BACKGROUND

As steam is introduced into a steam oven while an oven cavity is heating, the steam contacts cold surfaces and condenses into liquid water. The condensation initially appears as fog that gradually forms larger water droplets. The condensation appears on the cavity walls as well as an inner door glass surface. The fog and water droplets that condense on the inner door glass surface prevent the customer from seeing items placed in the oven cavity for cooking.

SUMMARY

In an example embodiment, a non-transitory computer-readable medium is provided having stored thereon computer-readable instructions that when executed by a processor, cause a glass heater controller to control a glass heater in an oven door. (A) An indicator of an oven cavity temperature value or an oven temperature setpoint value is received. The oven cavity temperature value indicates a current temperature in an oven cavity of an oven. The oven temperature setpoint value indicates a temperature set point for the oven. (B) A voltage value or a current value to be provided to operate a glass heater is determined based on the indicated oven cavity temperature value or the indicated oven temperature setpoint value. The glass heater is mounted to a door of the oven to heat glass mounted to the door. The glass provides a view into the oven cavity. (C) Provision of the determined voltage value or the determined current value is controlled to operate the glass heater. (D) (A) through (C) are repeated until the oven is switched to an off-state.

In another example embodiment, an oven door is provided. The oven door may include, but is not limited to, a wall, a processor, and a non-transitory computer-readable medium operably coupled to the processor. The wall is mounted to an oven to define a moveable wall of an oven cavity. The computer-readable medium has instructions stored thereon that, when executed by the processor, cause the glass heater controller to control the glass heater. The wall is mounted to the oven to define a moveable wall of the oven cavity. The wall may include, but is not limited to, a panel frame, a glass sheet, and the glass heater connected to provide a voltage or a current to the glass sheet to heat the glass sheet. The panel frame may include, but is not limited to, a frame wall that defines an aperture. The glass sheet is mounted to the panel frame to cover the aperture and to provide a view into the oven cavity of the oven when the wall is in a closed position to define the oven cavity.

In yet another example embodiment, an oven is provided. The oven may include, but is not limited to, a plurality of walls and the oven door mounted to at least one wall of the plurality of walls.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 22C depicts a zoomed bottom, right perspective view of the oven door panel of FIG. 4 in accordance with an illustrative embodiment.

FIG. 22D depicts a zoomed bottom, left perspective view of the oven door panel of FIG. 4 in accordance with an illustrative embodiment.

DETAILED DESCRIPTION

Figure 1:
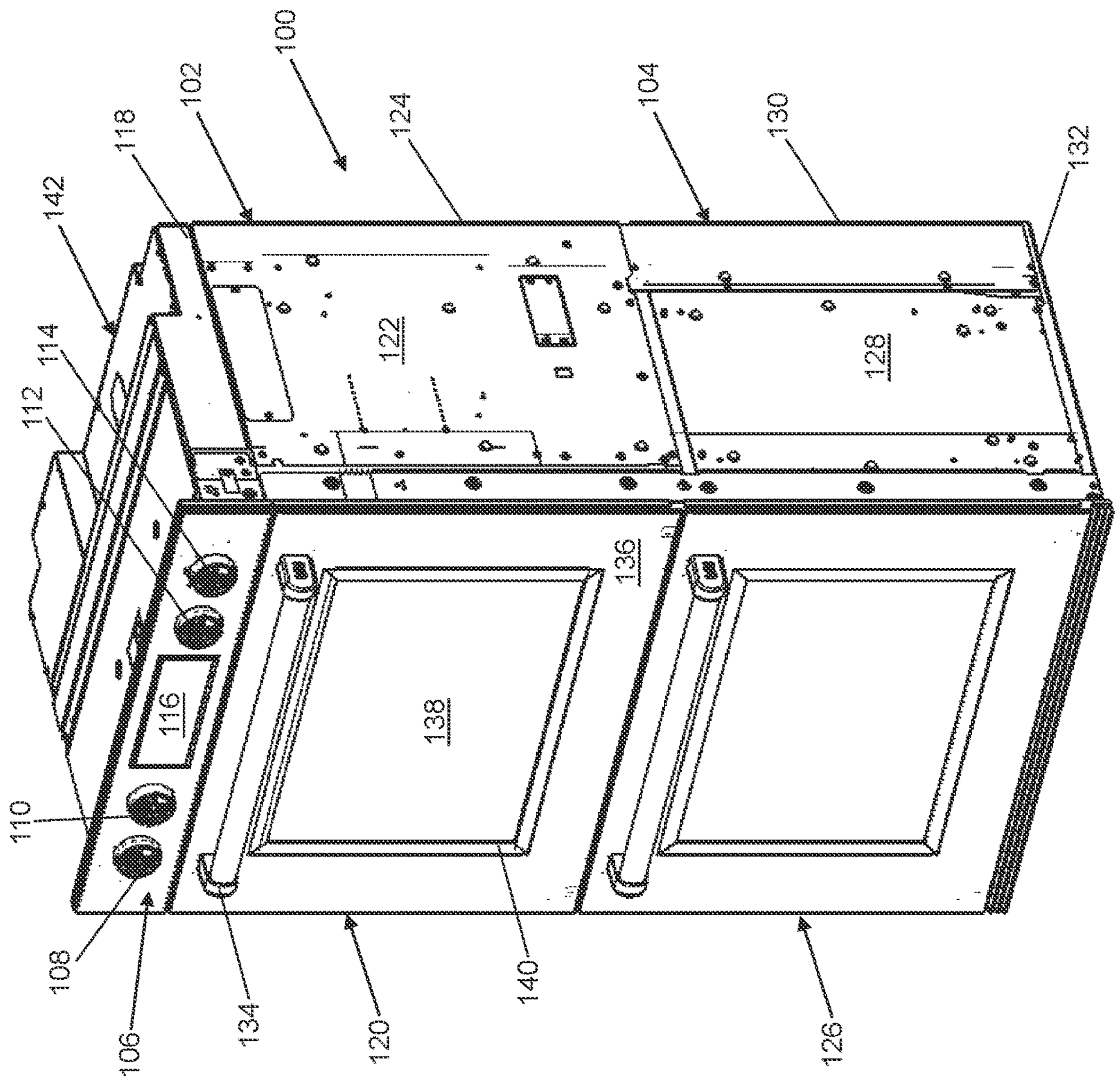
FIG. 1 depicts a top, front, right perspective view of a double oven in accordance with an illustrative embodiment.

Referring to FIG. 1, a top, front, right perspective view of a double oven 100 is shown in accordance with an illustrative embodiment. Double oven 100 may include a top oven 102 and a bottom oven 104. In the illustrative embodiment, top oven 102 is mounted above bottom oven 104. In an alternative embodiment, top oven 102 may be a single oven without bottom oven 104 or may be mounted below bottom oven 104. In an alternative embodiment, top oven 102 may be incorporated in a range or other appliance that includes an oven cavity. In an alternative embodiment, top oven 102 and bottom oven 104 may be mounted in side-by-side fashion.

Either or both of top oven 102 and bottom oven 104 may include a steam cooking function and may be referred to as a steam oven. Either or both of top oven 102 and bottom oven 104 may support other cooking modes such as bake, roast, clean, broil, convection, warm, defrost, sous vide, sabbath, etc. in addition to a steam mode each of which may be provided at various temperatures using various types of heat sources as understood by a person of skill in the art. For example, the heat source may be gas or electrical.

Top oven 102 and bottom oven 104 may be controlled using a control panel 106 that may include a top oven mode knob 108, a top oven temperature control knob 110, a bottom oven mode knob 112, a bottom oven temperature control knob 114, and a display 116. Top oven mode knob 108 and top oven temperature control knob 110 may be used to control operation of top oven 102. Bottom oven mode knob 112 and bottom oven temperature control knob 114 may be used to control operation of bottom oven 104. In the illustrative embodiment, top oven mode knob 108 and bottom oven mode knob 112 allow the user to select a cooking mode such as steam, bake, roast, clean, broil, convection, warm, sabbath for a respective oven. In the illustrative embodiment, top oven temperature control knob 110 and bottom oven temperature control knob 114 allow the user to select a temperature at which the selected cooking mode is performed. Top oven 102 and/or bottom oven 126 may include a common or separate controllers configured to operate each oven based on the selected cooking mode and temperature setpoint. The temperature and cooking mode controls may be implemented using a dial, display 116, a switch, etc. to allow the user to increase or decrease the temperature setpoint value or to enter a specific temperature setpoint value or select the cooking mode in alternative embodiments.

Display 116 may provide additional options for selection by the user and/or may provide information regarding a state of each oven. For example, display 116 may indicate whether either or both of top oven 102 and bottom oven 104 are in an on-state, the cooking mode selected using top oven mode knob 108 and/or bottom oven mode knob 112 for each respective oven that is in the on-state, an oven temperature setpoint value selected using top oven mode knob 108 and/or bottom oven mode knob 112 for each respective oven that is in the on-state, an oven cavity temperature value for each respective oven that is in the on-state, etc. The oven cavity temperature value indicates a current temperature in a respective oven cavity of top oven 102 and bottom oven 104.

When either or both of top oven 102 and bottom oven 104 provide the steam cooking mode, a water source is further provided. For example, a water source may be mounted behind control panel 106 and accessed by the user using various methods known to a person of skill in the art. For example, display 116 may rotate up or down or slide outward and inward to provide access to the water source such as a tray.

In the illustrative embodiment, top oven 102 may include a first top wall 118, a top door 120, a first right side wall 122, a first back wall 124, a first left side wall (not shown), and a first bottom wall (not shown). First top wall 118, top door 120, first right side wall 122, first back wall 124, first left side wall, and first bottom wall define an oven cavity within which items can be placed for cooking. As understood by a person of skill in the art, various racks may be mounted within the oven cavity to support the items. A right hinge assembly 200 (shown referring to FIG. 2) and a left hinge assembly 202 (shown referring to FIG. 2) mount top door 120 to first right side wall 122 and to the first left side wall, respectively, so that top door 120 can be rotated to an open position to allow access to the oven cavity. Various hinges may be used that may include one or more brackets and/or a pneumatic air cylinder to control rotation of top door 120 from an open position to a closed position and vice versa as understood by a person of skill in the art. In an alternative embodiment, right hinge assembly 200 and left hinge assembly 202 may be mounted between top door 120 and a right side of first back wall 124 and a left side of first back wall 124, respectively, or between top door 120 and a right side of the first bottom wall and a left side of the first bottom wall, respectively.

Similarly, bottom oven 104 may include a second top wall (not shown), a bottom door 126, a second right side wall 128, a second back wall 130, a second left side wall (not shown), and a second bottom wall 132. The first bottom wall and the second top wall may form a common wall between top oven 102 and bottom 104 due to the top and bottom arrangement. The second top wall, bottom door 126, second right side wall 128, second back wall 130, the second left side wall, and second bottom wall 132 define a second oven cavity within which items can be placed for cooking separate from top oven 102. One or more hinges (not shown) may similarly mount bottom door 126 to one or more walls that define the second oven cavity.

The walls and top door 120 of top oven 102 and the walls and bottom door 126 of bottom oven 104 may be formed of one or more materials, such as metal, glass, and/or plastic having a sufficient strength and rigidity to provide the illustrated and/or described function. Each wall may be formed of one or more plates. For each wall comprised of a plurality of plates, the plurality of plates may be mounted to each other using various fasteners or fastening methods with electrical wiring, ducts, tubing, sensors, and/or insulation possibly mounted between the plurality of plates. Various fasteners or fastening methods such as screws, rivets, soldering, molding, etc. further may be used to mount various components described herein to each other. In the illustrative embodiment, the walls and top door 120 of top oven 102 and the walls and bottom door 126 of bottom oven 104 generally have rectangular shapes on the exterior though the walls and doors may have another shape including another type of polygon, a circle, an ellipse, etc.

Top door 120 may include a handle 134, a front panel frame 136, and a front panel glass sheet 138. Handle 134 is mounted to a top portion of front panel frame 136 and protrudes Front panel frame 136 is mounted to front panel glass sheet 138. Front panel frame 136 includes a frame wall 140 that defines an aperture. In the illustrative embodiment, frame wall 140 defines a rectangular aperture through the aperture may have another shape including another type of polygon, a circle, an ellipse, etc. The aperture is covered by front panel glass sheet 138. Items in the oven cavity of top oven 102 are visible through the aperture defined by frame wall 140.

In the illustrative embodiment, handle 134 is mounted to a top portion of front panel frame 136 above the aperture and protrudes outward from front panel frame 136. A user may grasp handle 134 to rotate top door 120 to an open position or to rotate top door 120 to a closed position. Though not separately described, bottom door 126 may be similar to top door 120, and bottom oven 104 may be formed and operated in a similar manner to top oven 102.

In the illustrative embodiment, a top compartment 142 may be mounted above first top wall 118 of top oven 102. Top compartment 142 may house electronic controls that control the operation of top oven 102 and/or bottom oven 104 as well as the water source for the steam operating mode. In alternative embodiments, the electronic controls and/or water source may be mounted to other walls of double oven 100 such as below bottom oven 104.

Figure 2:
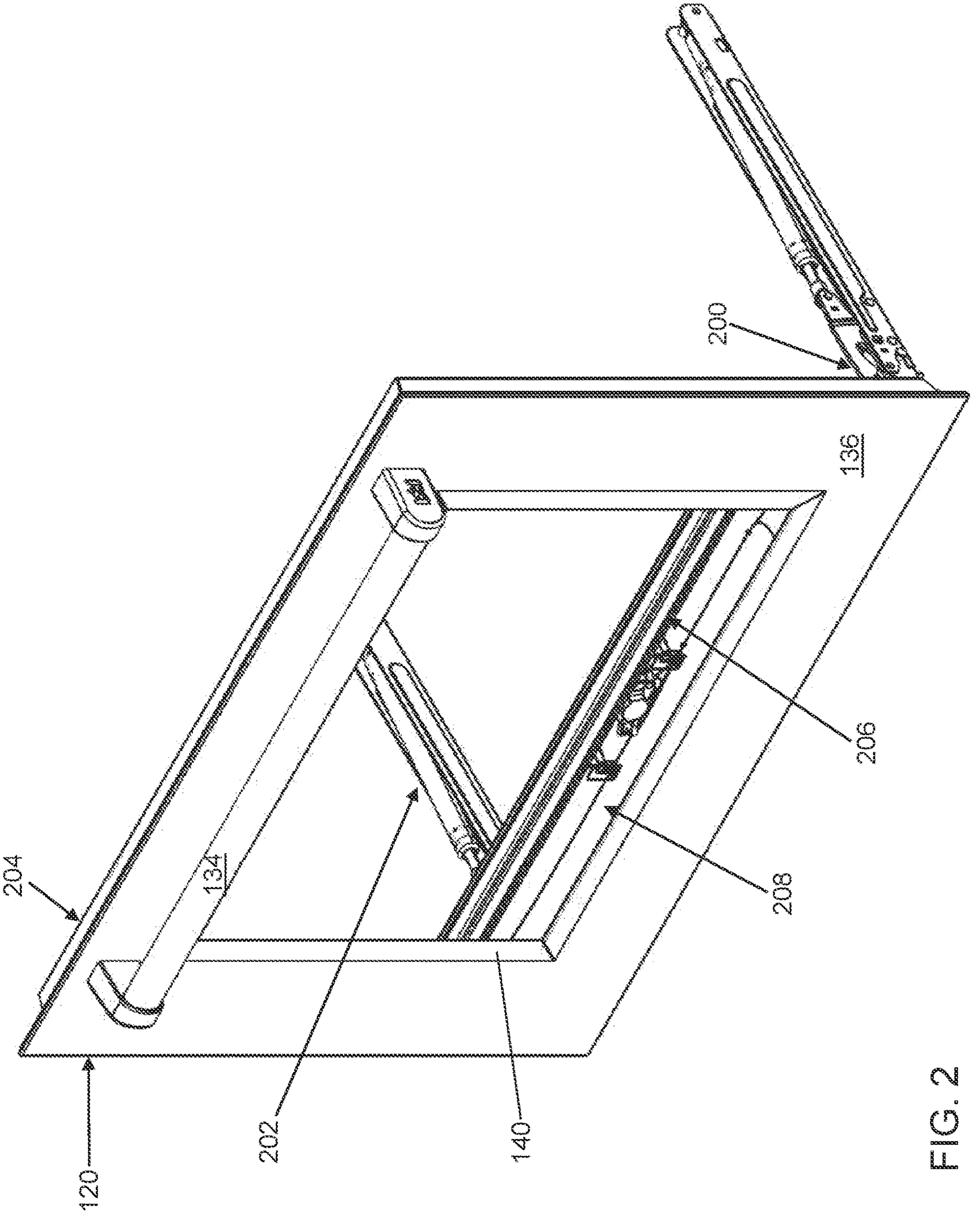
FIG. 2 depicts a top, front, right perspective view of an oven door of the double oven of FIG. 1 with mounting brackets in accordance with an illustrative embodiment.
Figure 3:
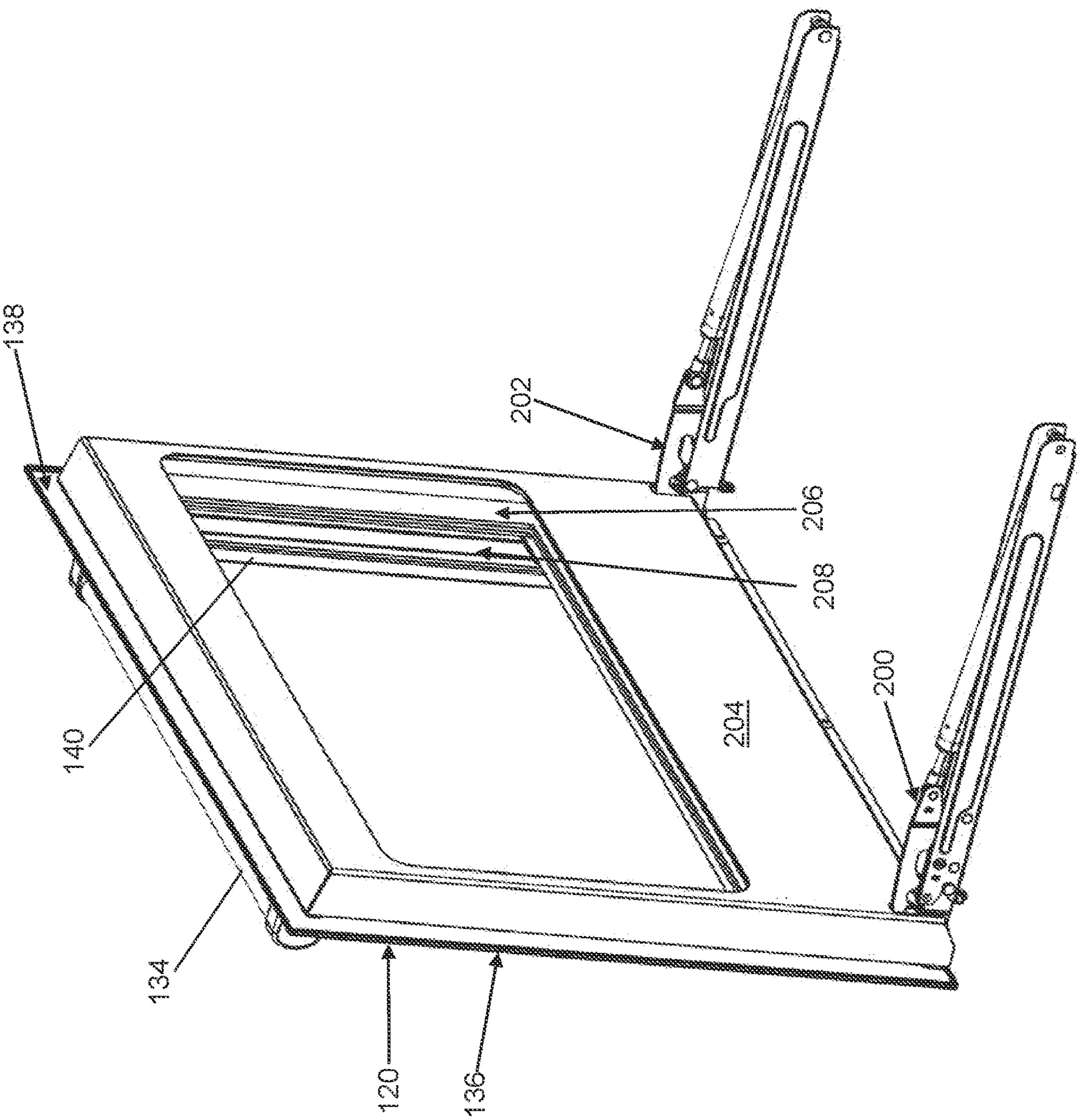
FIG. 3 depicts a top, back, right perspective view of the oven door of FIG. 2 with the mounting brackets in accordance with an illustrative embodiment.
Figure 4:
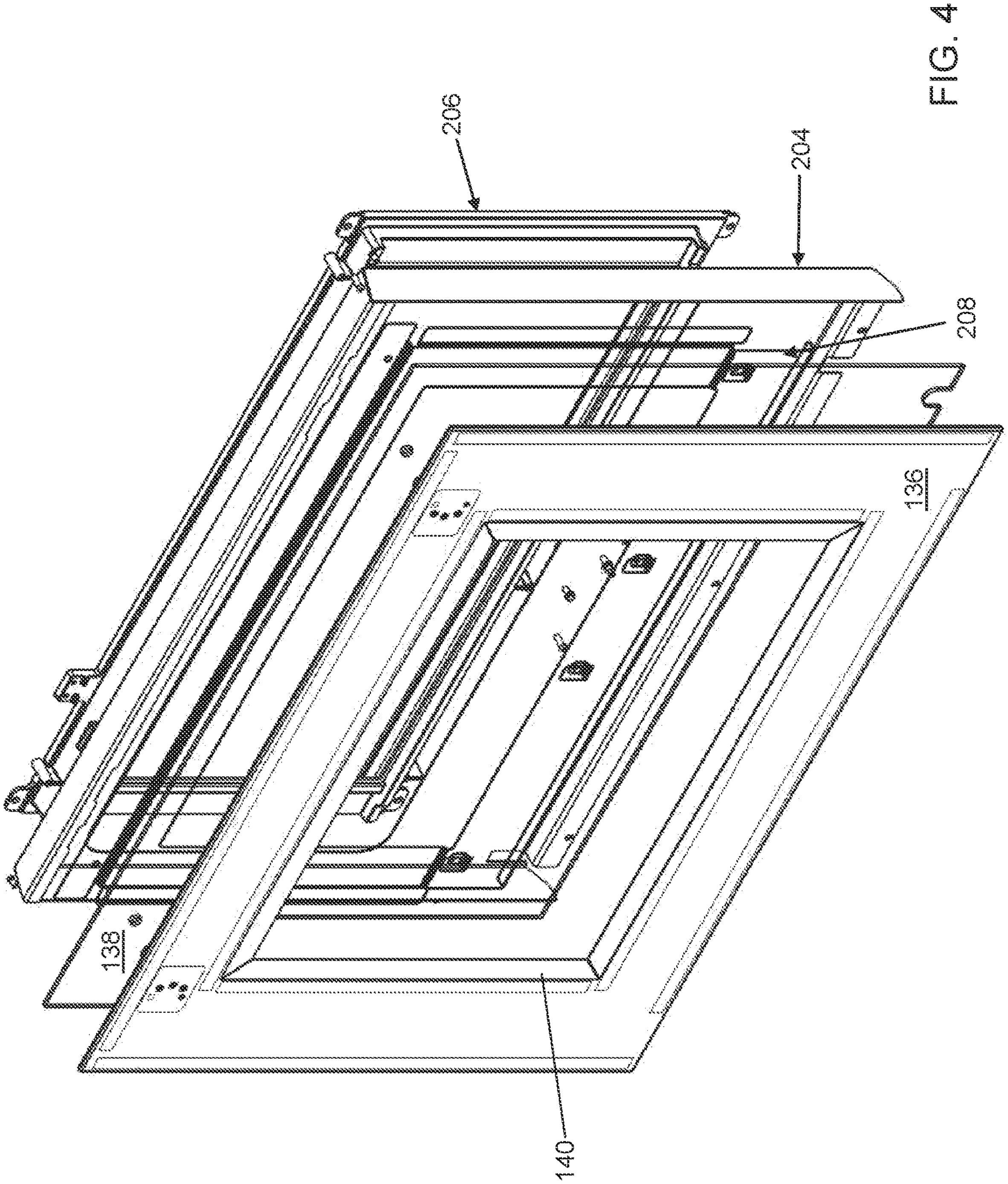
FIG. 4 depicts an exploded, top, front, right perspective view of an oven door panel of the oven door of FIG. 2 in accordance with an illustrative embodiment.
Figure 5:
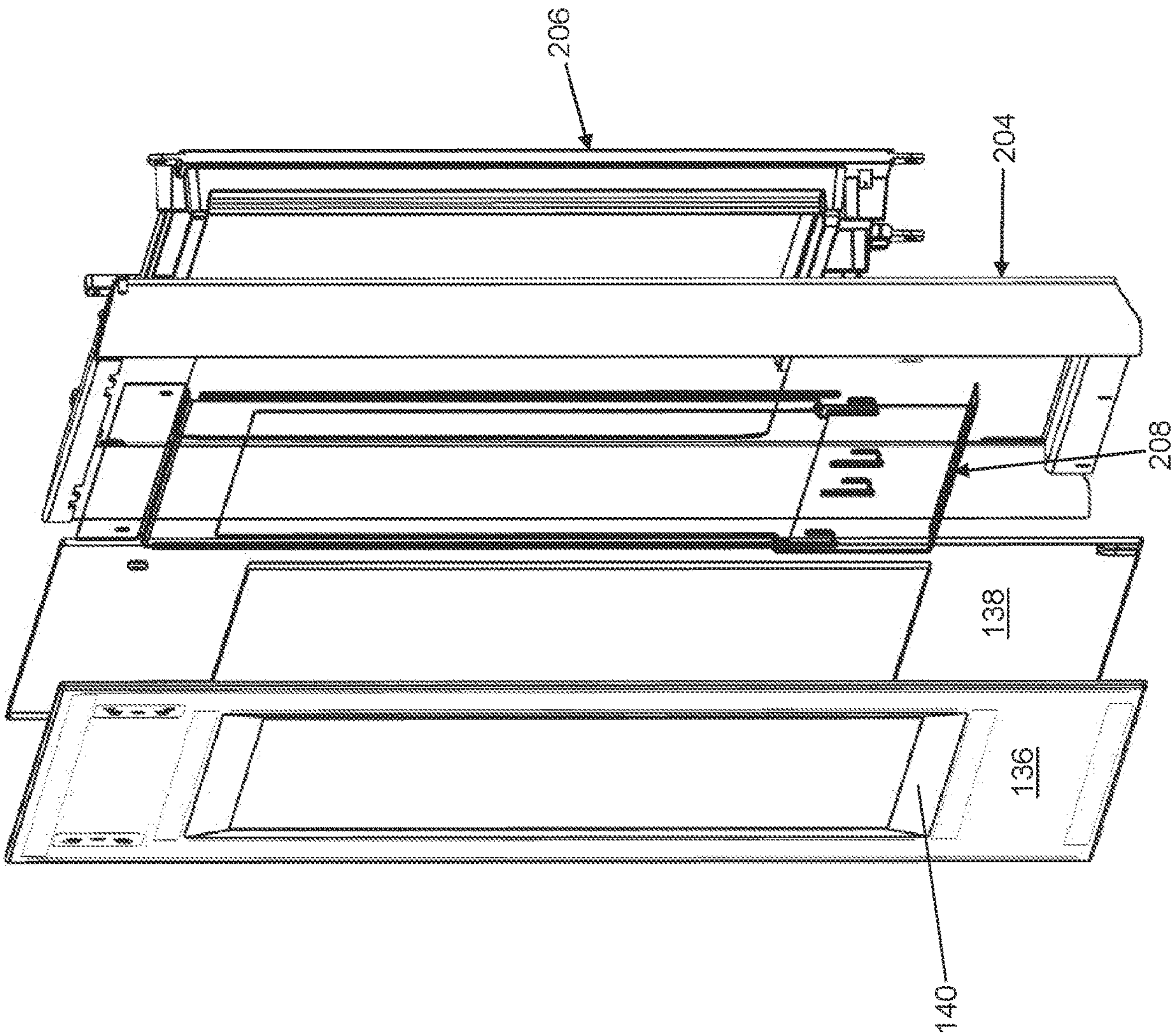
FIG. 5 depicts an exploded, front, right perspective view of the oven door panel of FIG. 4 in accordance with an illustrative embodiment.

Referring to FIG. 2, a top, front, right perspective view of top door 120 is shown in accordance with an illustrative embodiment. Referring to FIG. 3, a top, back, right perspective view of top door 120 is shown in accordance with an illustrative embodiment. Referring to FIG. 4, an exploded, top, front, right perspective view of panels of top door 120 are shown in accordance with an illustrative embodiment. Referring to FIG. 5, an exploded, front, right perspective view of the panels of top door 120 are shown in accordance with an illustrative embodiment. Top door 120 further may include a door liner 204, a heated glass assembly 206, and a deflector glass panel 208. Front panel frame 136, front panel glass sheet 138, deflector glass panel 208, heated glass assembly 206, and door liner 204 form a series of panels that are mounted to each other using various mounting methods to form top door 120. Top door 120 may include insulation and be formed of materials that reduce an amount of heat that escapes the oven cavity when top oven 102 is operated in the on-state.

Front panel glass sheet 138 is mounted to a back side of front panel frame 136 and may be formed of one or more layers of tempered, laminated glass. In an alternative embodiment, front panel glass sheet 138 may be formed with aluminum or other material framing a view port portion through which the user can view food placed inside top oven 102. For example, front panel glass sheet 138 may be mounted to the back side of front panel frame 136 using glue or adhesive tape though other fastening methods may be used to mount front panel glass sheet 138 to front panel frame 136. In an illustrative embodiment, front panel glass sheet 138 may be sealed again the back side of front panel frame 136.

Deflector glass panel 208 is mounted between front panel glass sheet 138 and heated glass assembly 206. Heated glass assembly 206 is mounted between deflector glass panel 208 and door liner 204.

Figure 6:
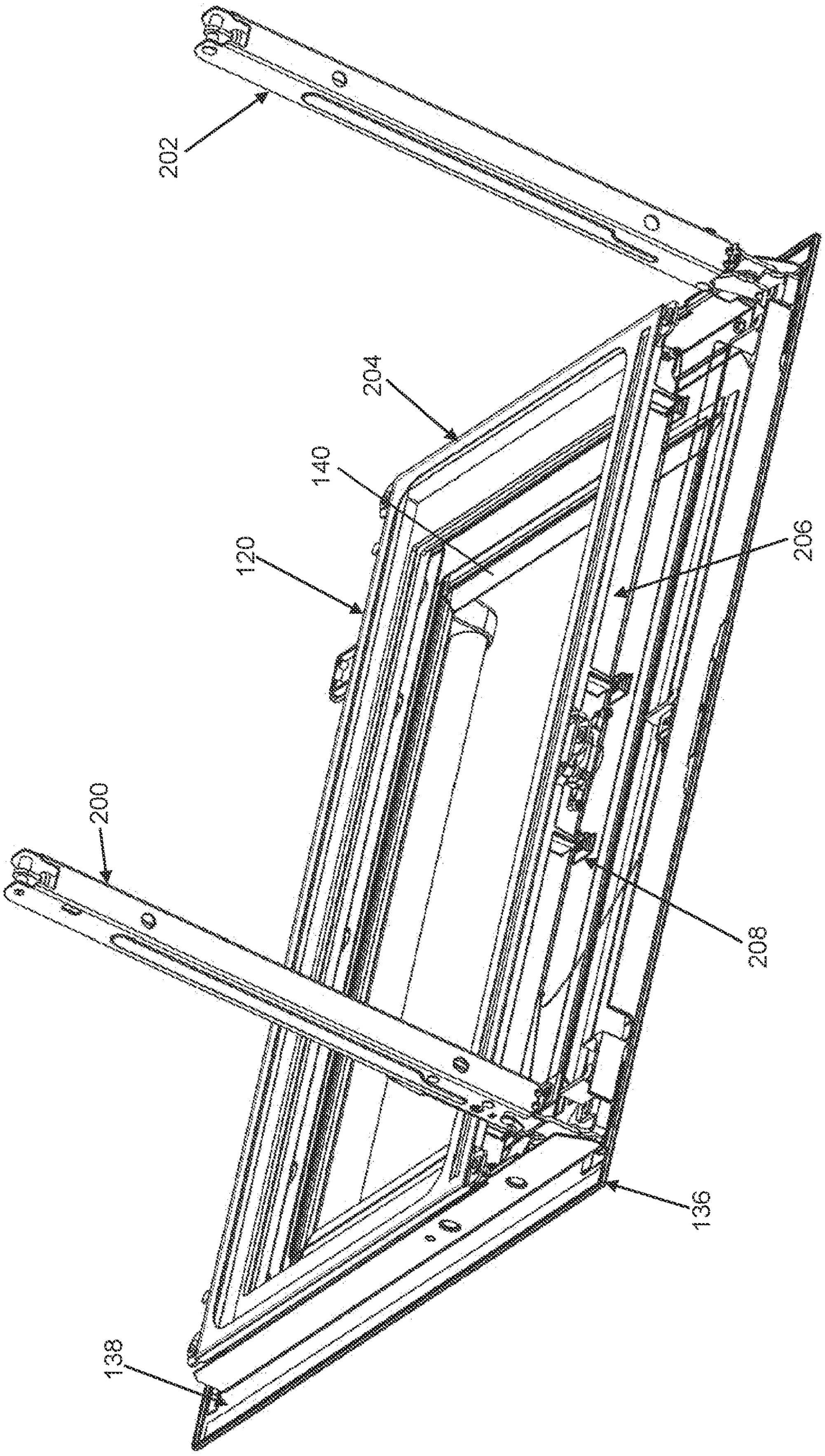
FIG. 6 depicts a bottom, back, right perspective view of the oven door of FIG. 2 with the mounting brackets in accordance with an illustrative embodiment.
Figure 7:
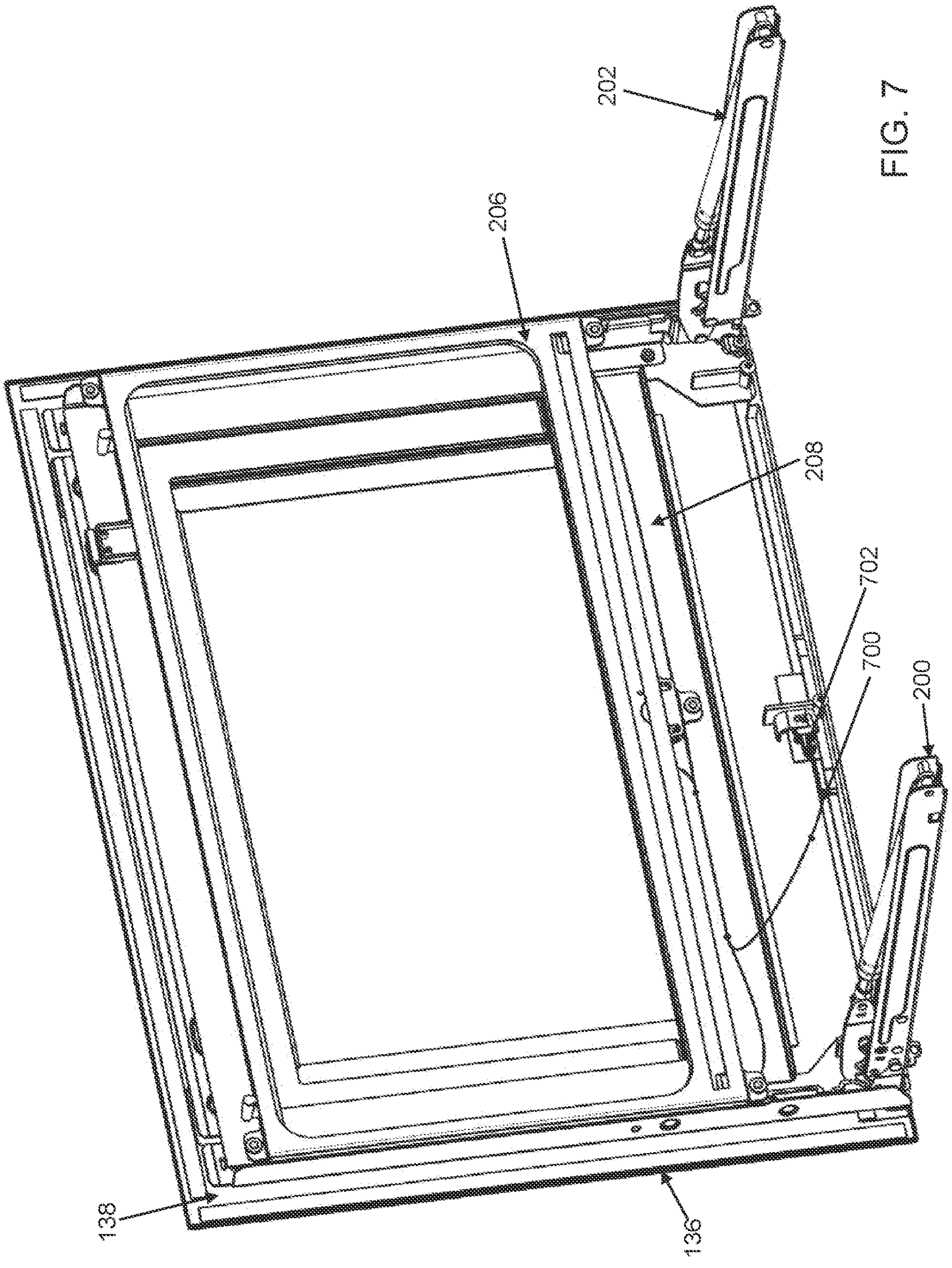
FIG. 7 depicts a top, back, right perspective view of the oven door of FIG. 2 with the mounting brackets and with a door liner removed in accordance with an illustrative embodiment.

Referring to FIG. 6, a bottom, back, right perspective view of top door 120 with door liner 204 removed is shown in accordance with an illustrative embodiment. Referring to FIG. 7, a top, back, right perspective view of top door 120 is shown with door liner 204 removed in accordance with an illustrative embodiment. Wire harness 700 connects to an electrical connector 702 that provides electrical power to heated glass assembly 206 as described further below.

Figure 8:
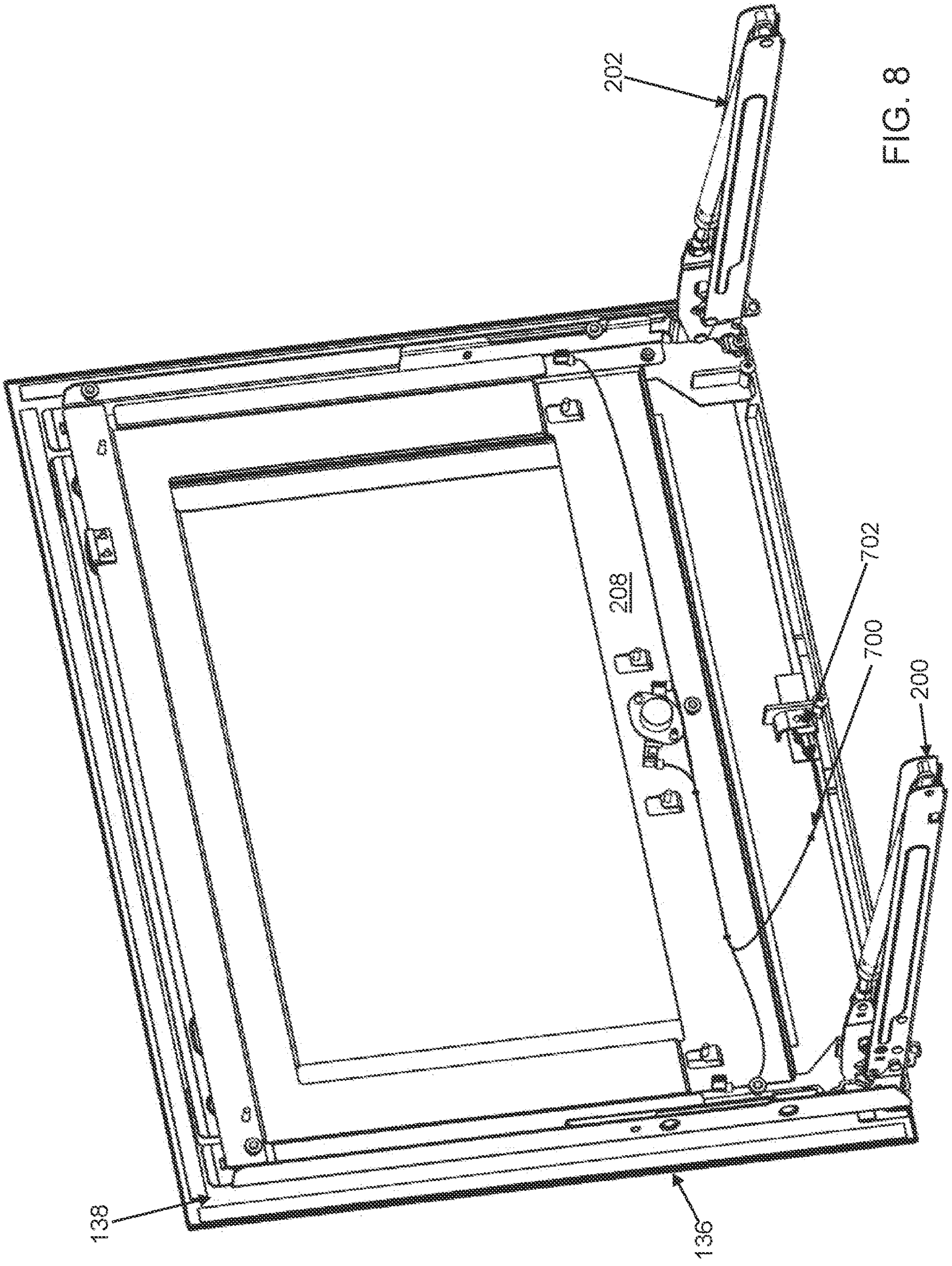
FIG. 8 depicts a top, back, right perspective view of the oven door of FIG. 7 with a heated glass assembly removed in accordance with an illustrative embodiment.
Figure 9:
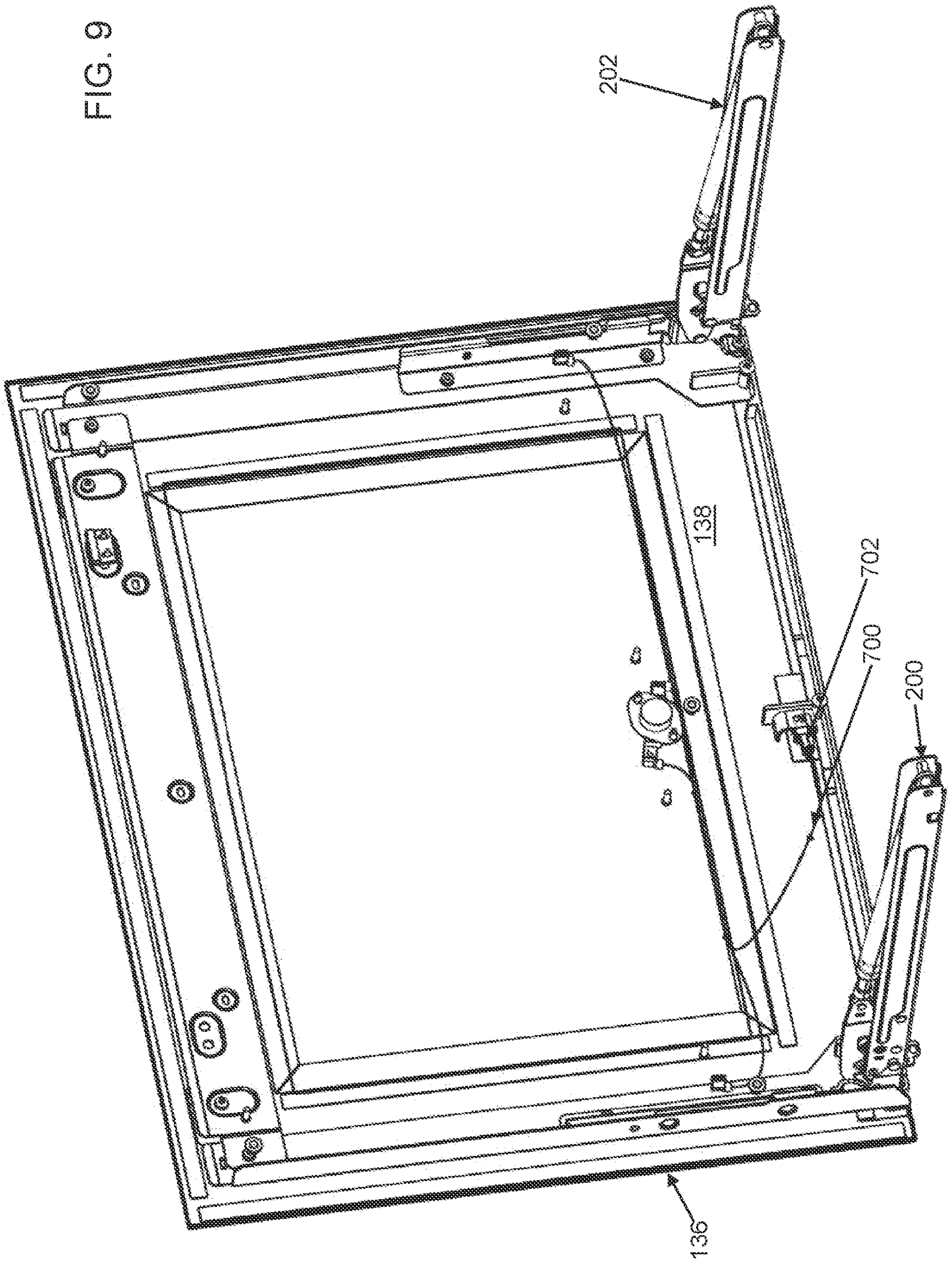
FIG. 9 depicts a top, back, right perspective view of the oven door of FIG. 8 with a deflector glass panel removed in accordance with an illustrative embodiment.
Figure 10:
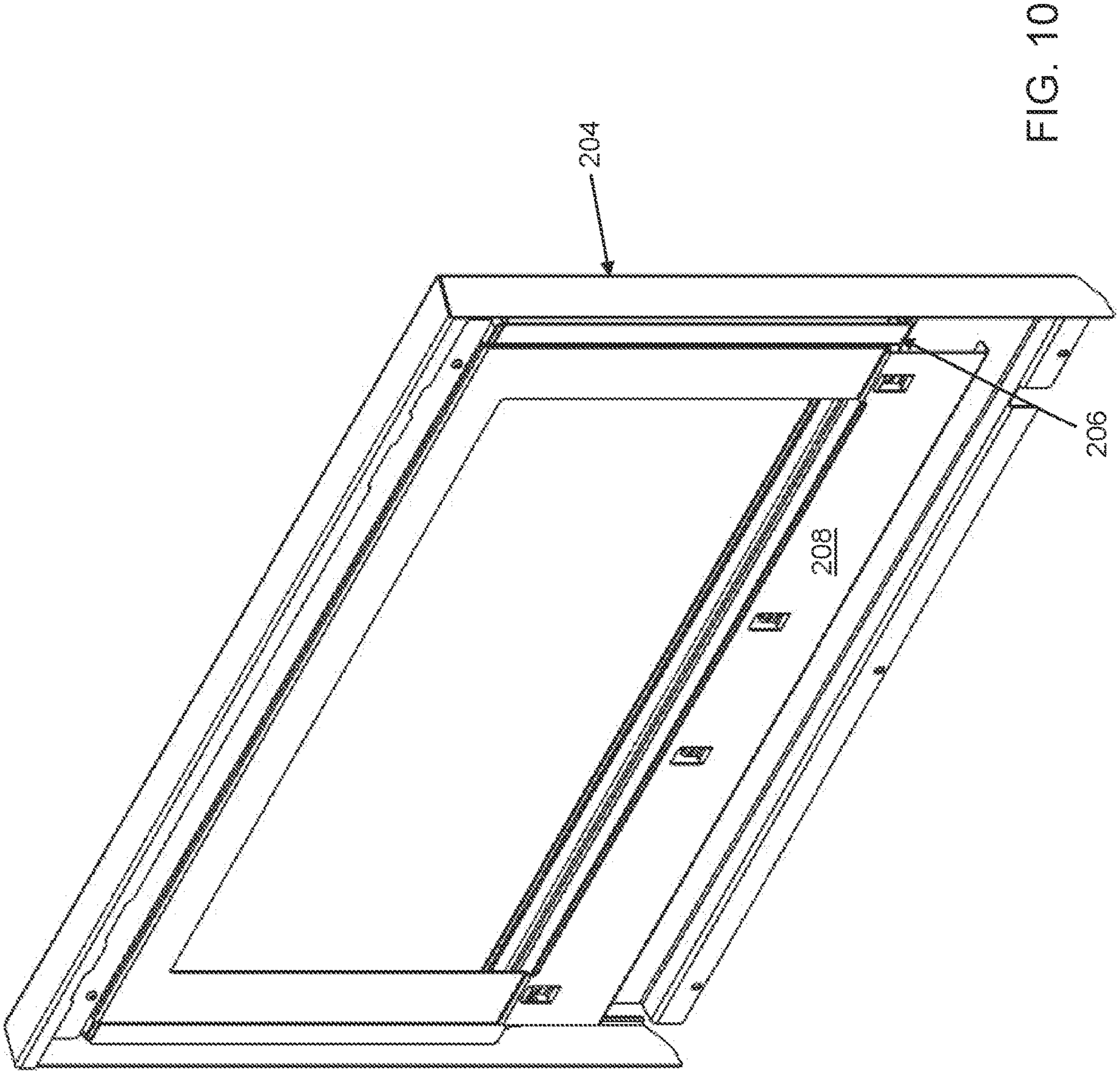
FIG. 10 depicts a top, front, right perspective view of the oven door panel of FIG. 4 with a front panel removed in accordance with an illustrative embodiment.

Referring to FIG. 8, a top, back, right perspective view of top door 120 is shown with door liner 204 and heated glass assembly 206 removed in accordance with an illustrative embodiment. Referring to FIG. 9, a top, back, right perspective view of top door 120 is shown with door liner 204, heated glass assembly 206, and deflector glass panel 208 removed in accordance with an illustrative embodiment. Referring to FIG. 10, a top, front, right perspective view of top door 120 is shown with front panel frame 136 and front panel glass sheet 138 removed in accordance with an illustrative embodiment.

Figure 11:
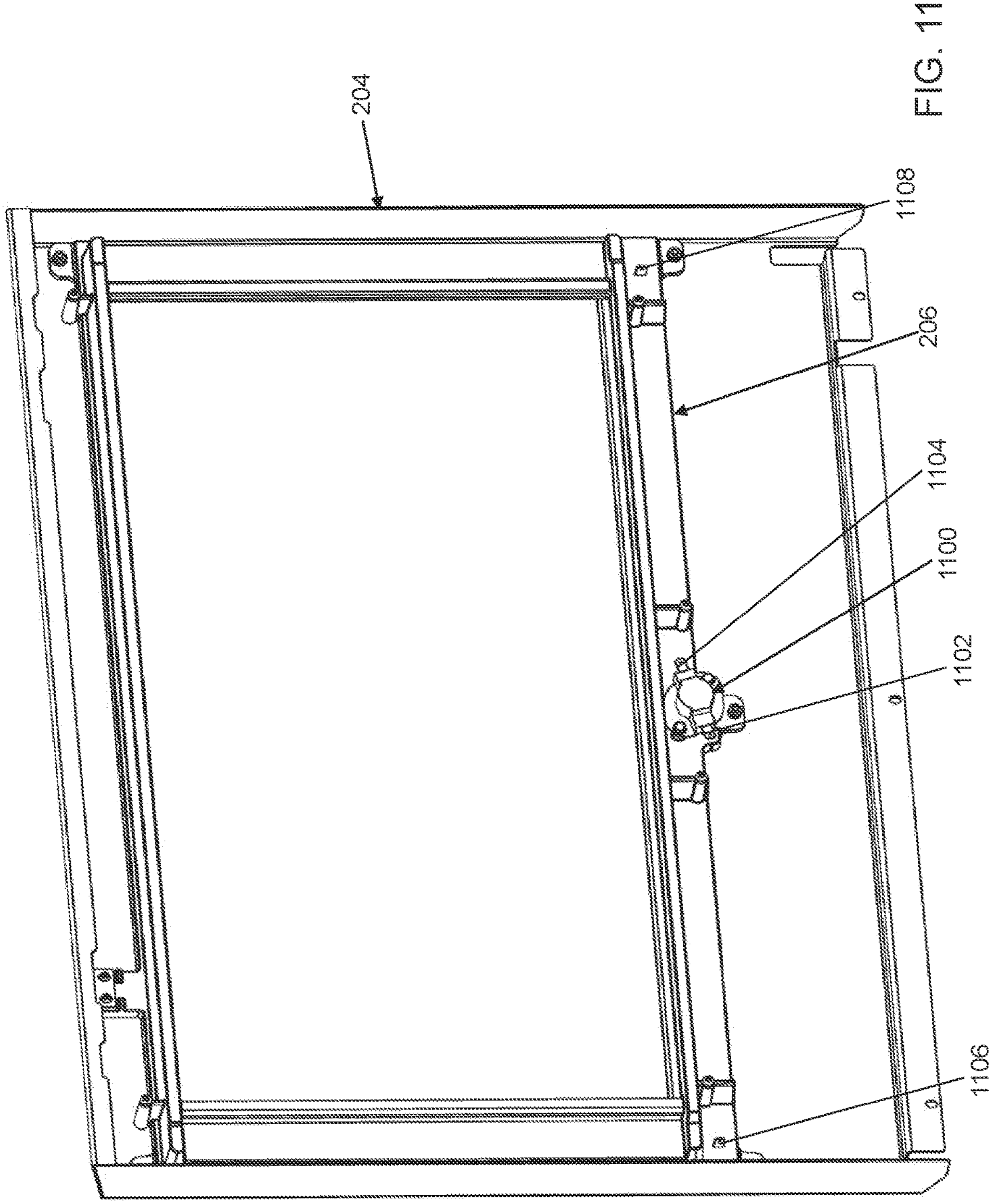
FIG. 11 depicts a front, left perspective view of the oven door panel of FIG. 10 with the deflector glass panel removed in accordance with an illustrative embodiment.

Referring to FIG. 11, a front, left perspective view of top door 120 is shown with front panel frame 136, front panel glass sheet 138, and deflector glass panel 208 removed in accordance with an illustrative embodiment. Heated glass assembly 206 may include a thermal cutout switch 1100, a first thermal cutout connector 1102, a second thermal cutout connector 1104, a first glass heater connector 1106, and a second glass heater connector 1108.

Figure 12:
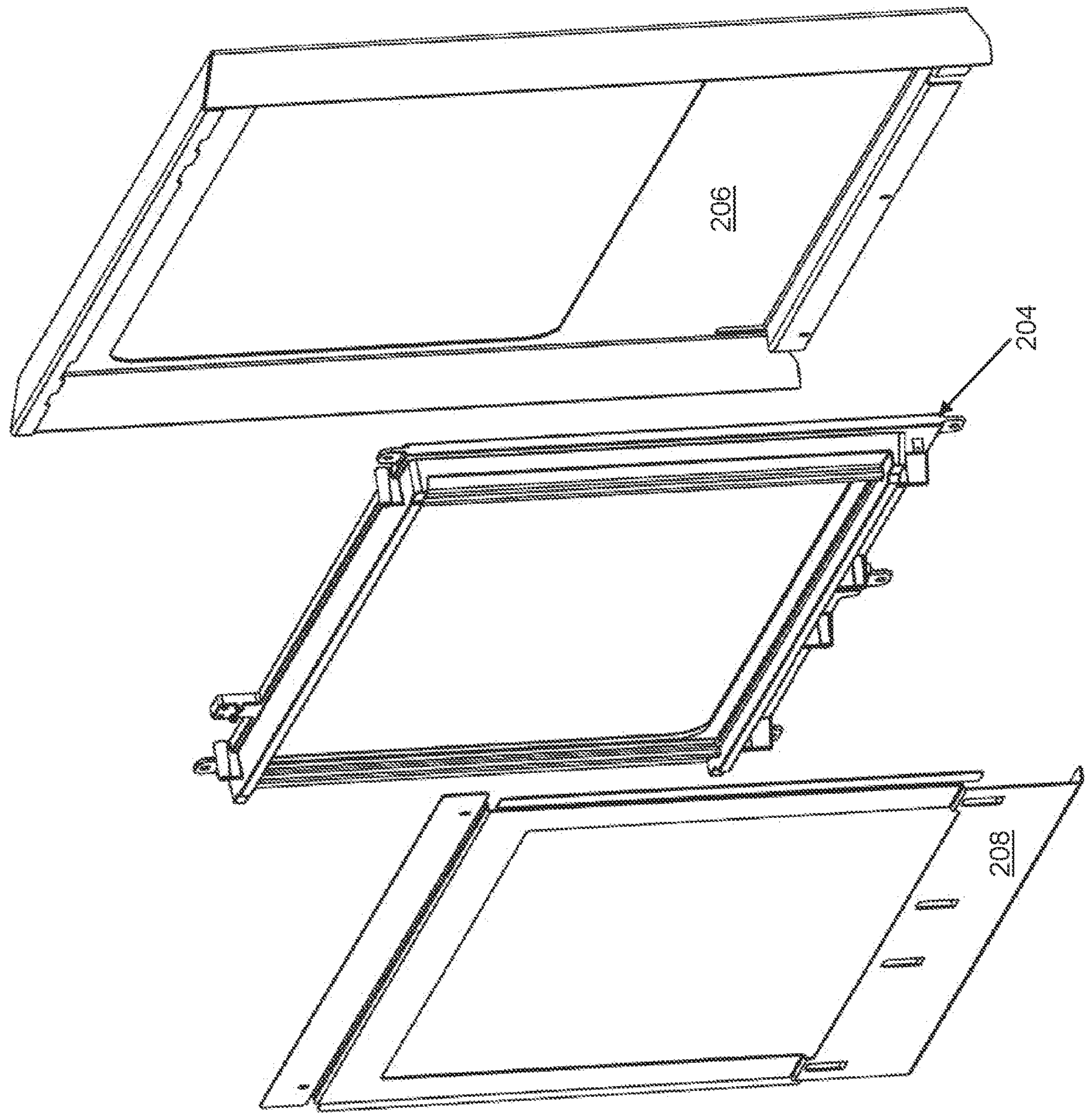
FIG. 12 depicts an exploded, top, front, right perspective view of the oven door panel of FIG. 10 in accordance with an illustrative embodiment.

Referring to FIG. 12, an exploded, top, front, right perspective view of door liner 204, heated glass assembly 206, and deflector glass panel 208 is shown in accordance with an illustrative embodiment.

Figure 13A:
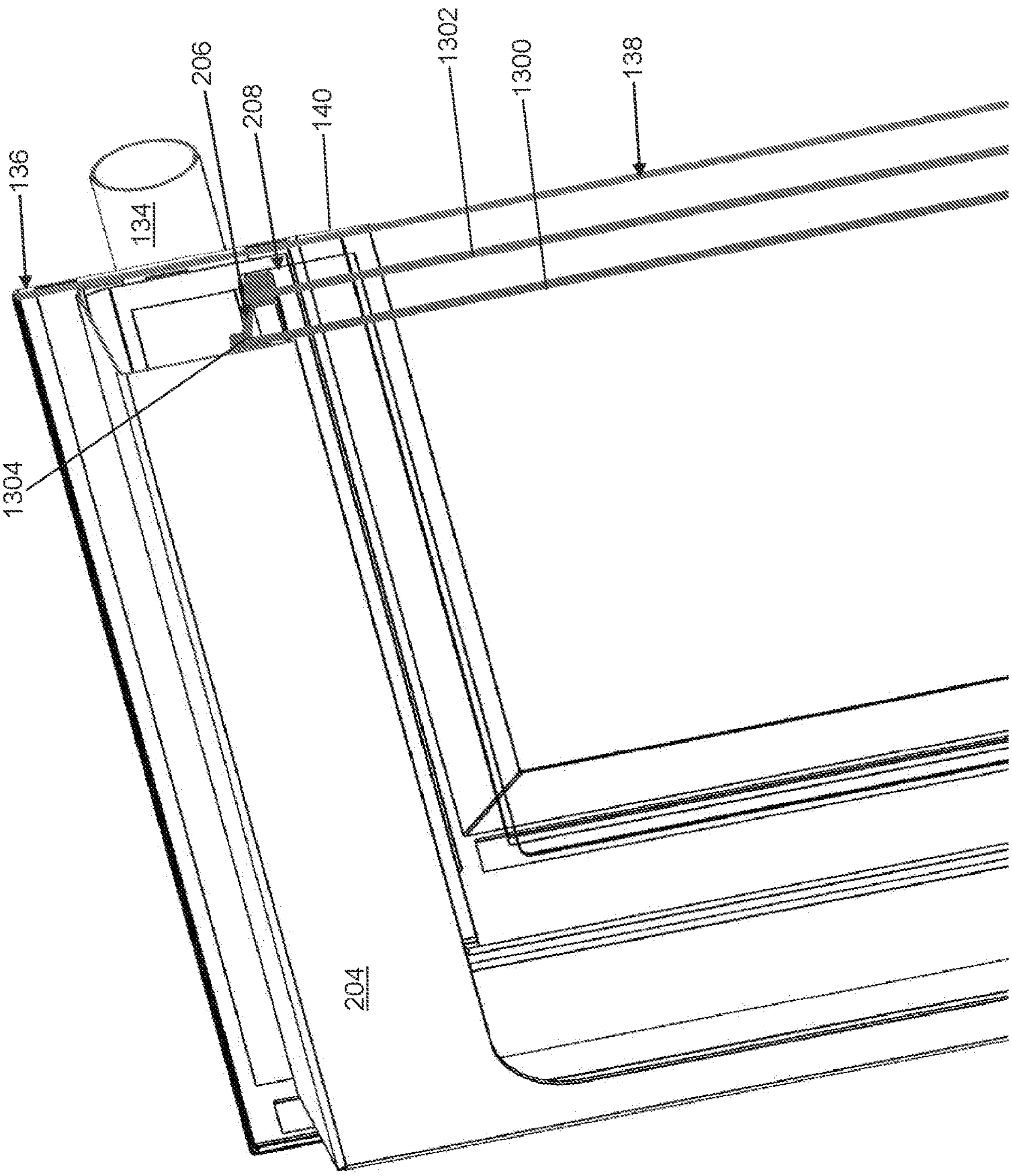
FIG. 13A depicts a top, back, left perspective, cross-sectional view of a top portion of the oven door panel of FIG. 4 in accordance with an illustrative embodiment.
Figure 13B:
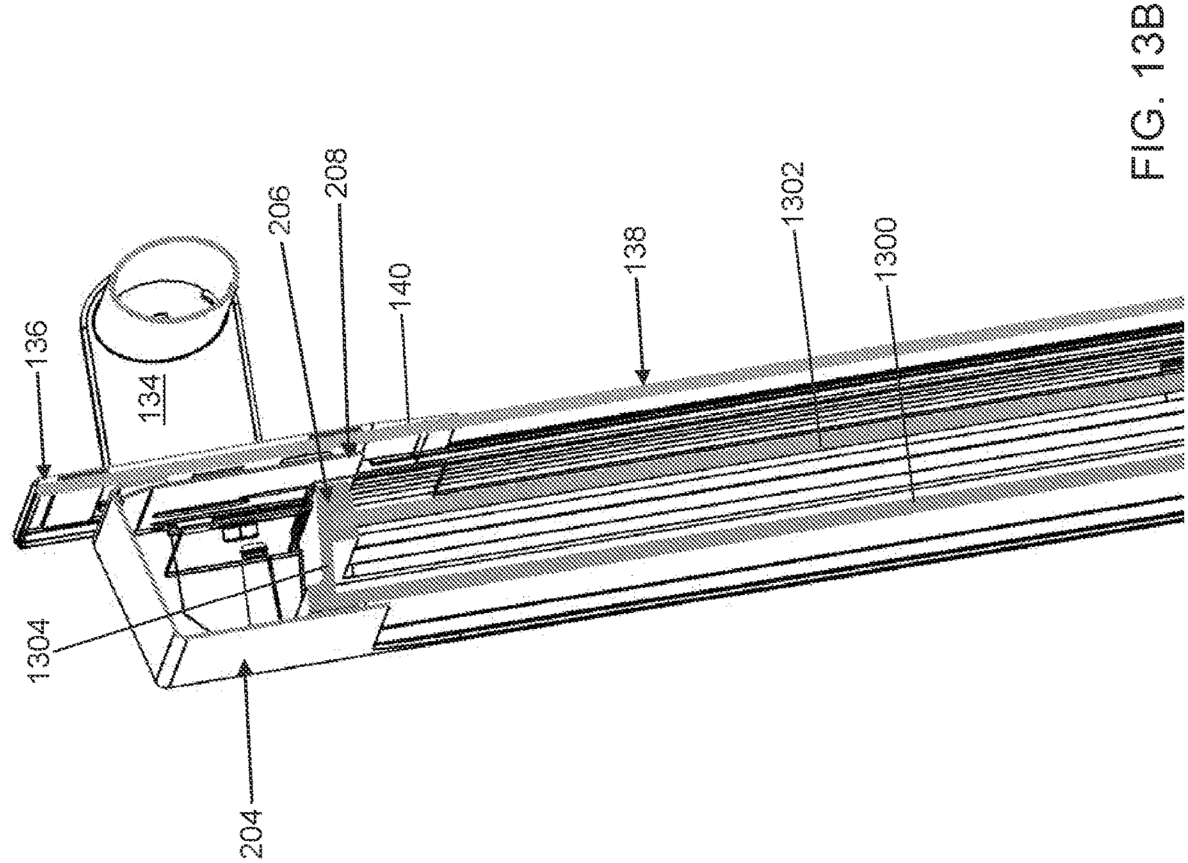
FIG. 13B depicts a top, left perspective, cross-sectional view of the oven door panel of FIG. 13A in accordance with an illustrative embodiment.

Referring to FIG. 13A, a top, back, left perspective, cross-sectional view of a top portion of top door 120 is shown in accordance with an illustrative embodiment. Referring to FIG. 13B, a top, left perspective, cross-sectional view of top door 120 is shown in accordance with an illustrative embodiment. Heated glass assembly 206 further may include a cavity glass sheet 1300 and a middle glass sheet 1302 mounted to a top frame 1304 and a bottom frame 1400 (shown referring to FIGS. 14A, 14B, and 14C). A gap may be formed between cavity glass sheet 1300 and middle glass sheet 1302 that may include air or another gas such as argon trapped therebetween. Cavity glass sheet 1300 is positioned closer to the oven cavity than middle glass sheet 1302. Middle glass sheet 1302 extends parallel between cavity glass sheet 1300 and front panel glass sheet 138.

Figure 14A:
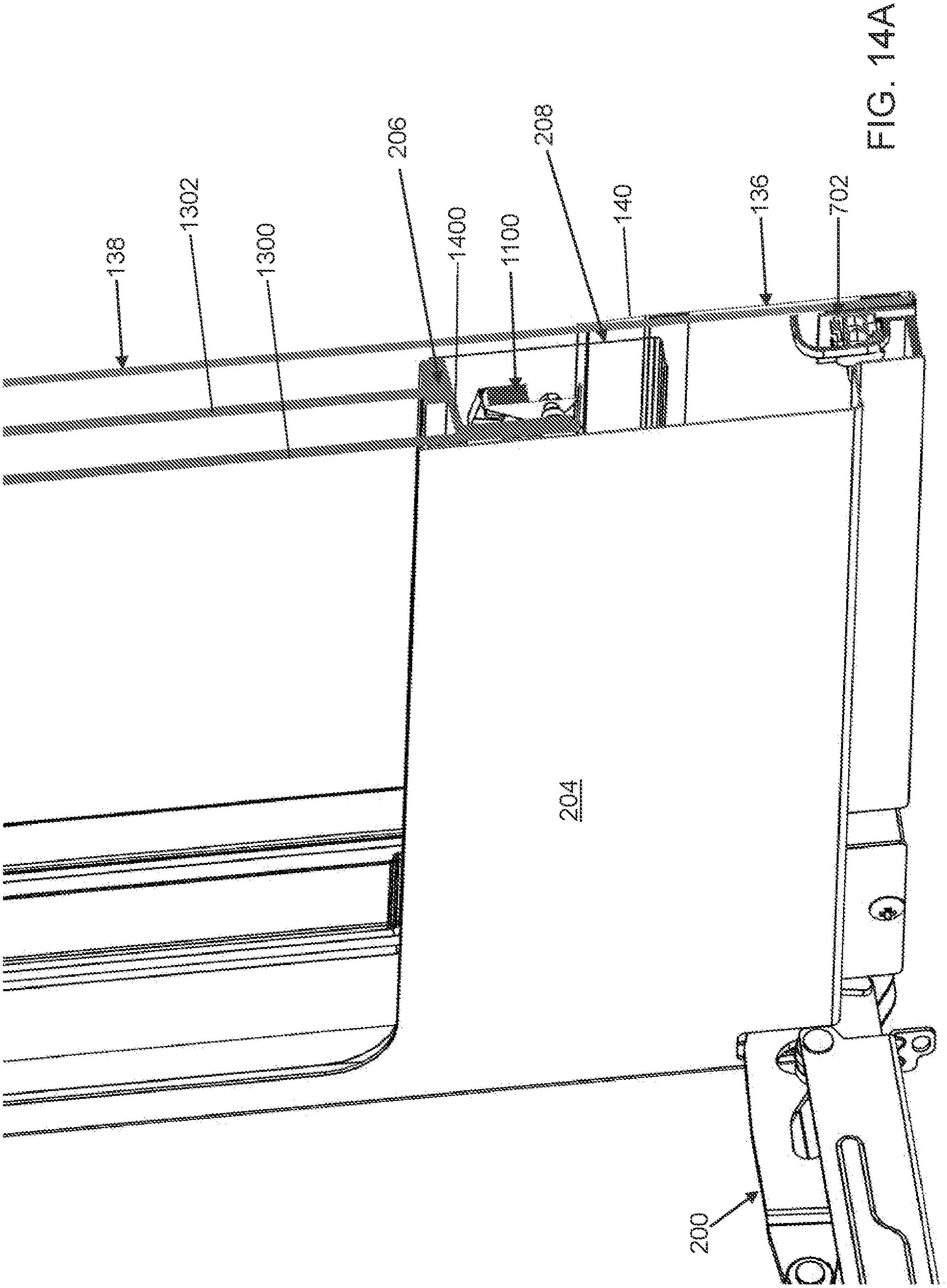
FIG. 14A depicts a back, left perspective, cross-sectional view of a bottom portion of the oven door panel of FIG. 4 in accordance with an illustrative embodiment.
Figure 14B:
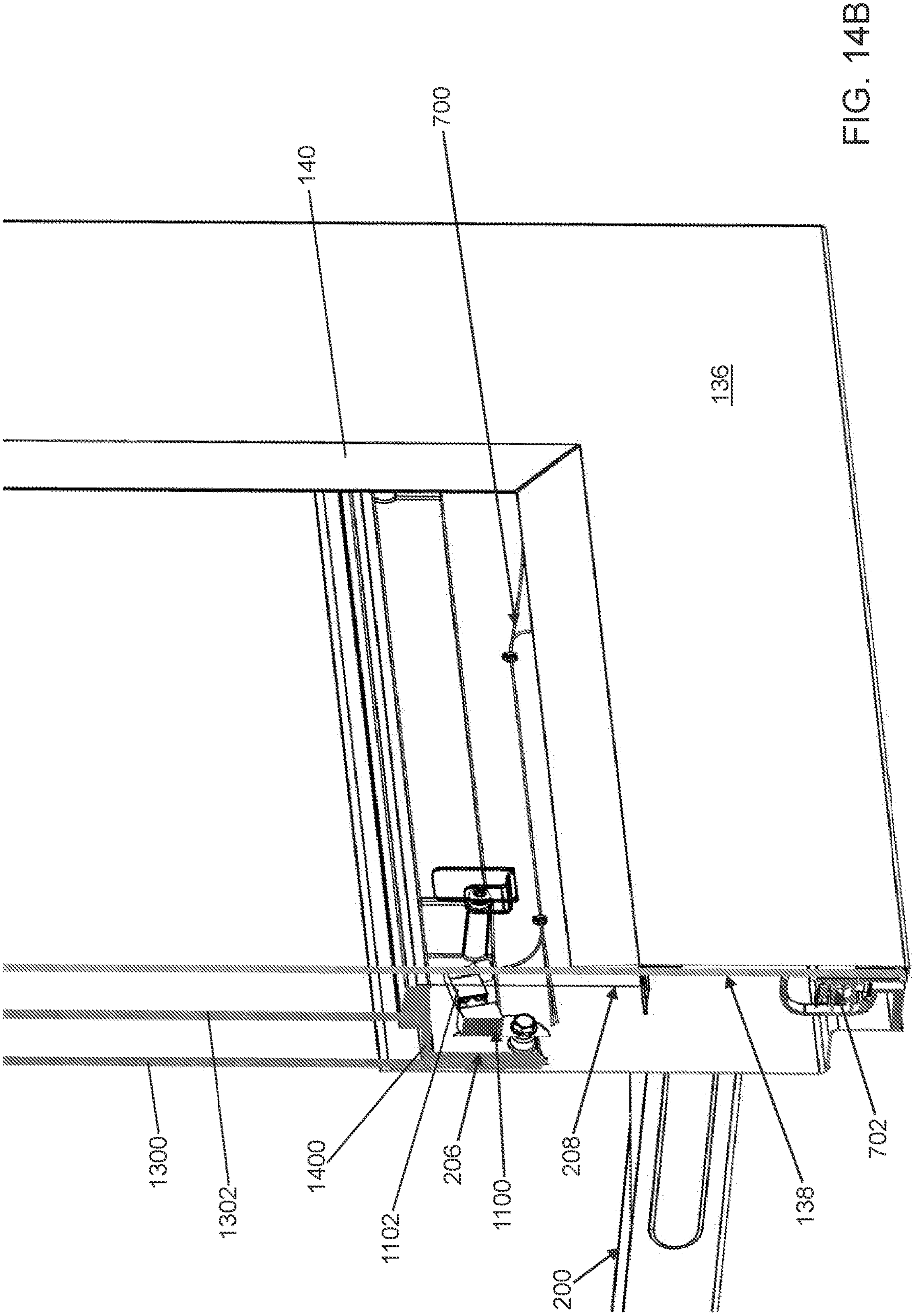
FIG. 14B depicts a front, left perspective, cross-sectional view of a bottom portion of the oven door panel of FIG. 4 in accordance with an illustrative embodiment.
Figure 14C:
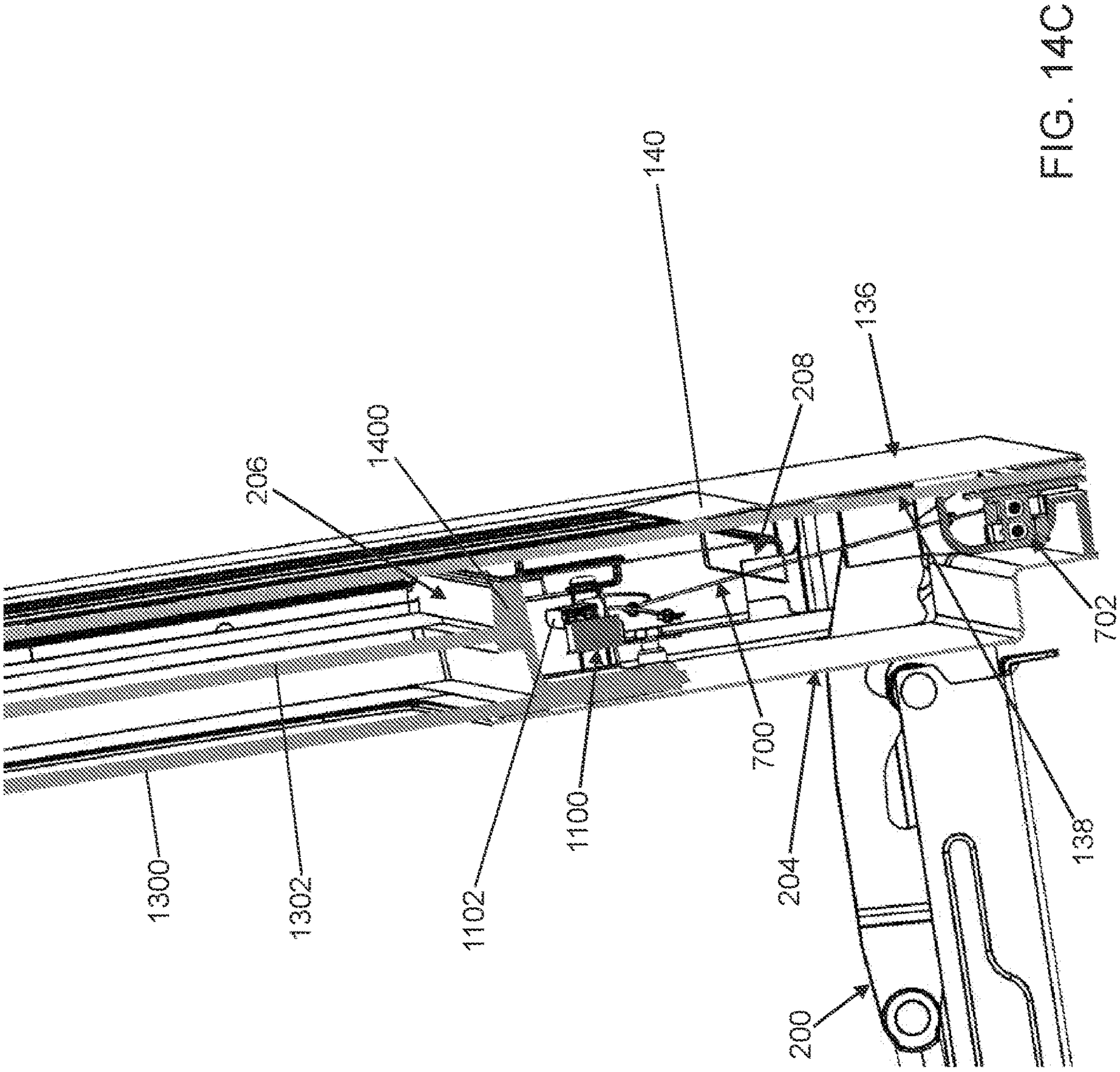
FIG. 14C depicts a bottom, back, left perspective, cross-sectional view of the oven door panel of FIG. 14A in accordance with an illustrative embodiment.

Referring to FIG. 14A, a back, left perspective, cross-sectional view of a bottom portion of top door 120 is shown in accordance with an illustrative embodiment. Referring to FIG. 14B, a front, left perspective, cross-sectional view of the bottom portion of oven door panel is shown in accordance with an illustrative embodiment. Referring to FIG. 14C, a bottom, back, left perspective, cross-sectional view of top door 120 is shown in accordance with an illustrative embodiment.

Figure 15:
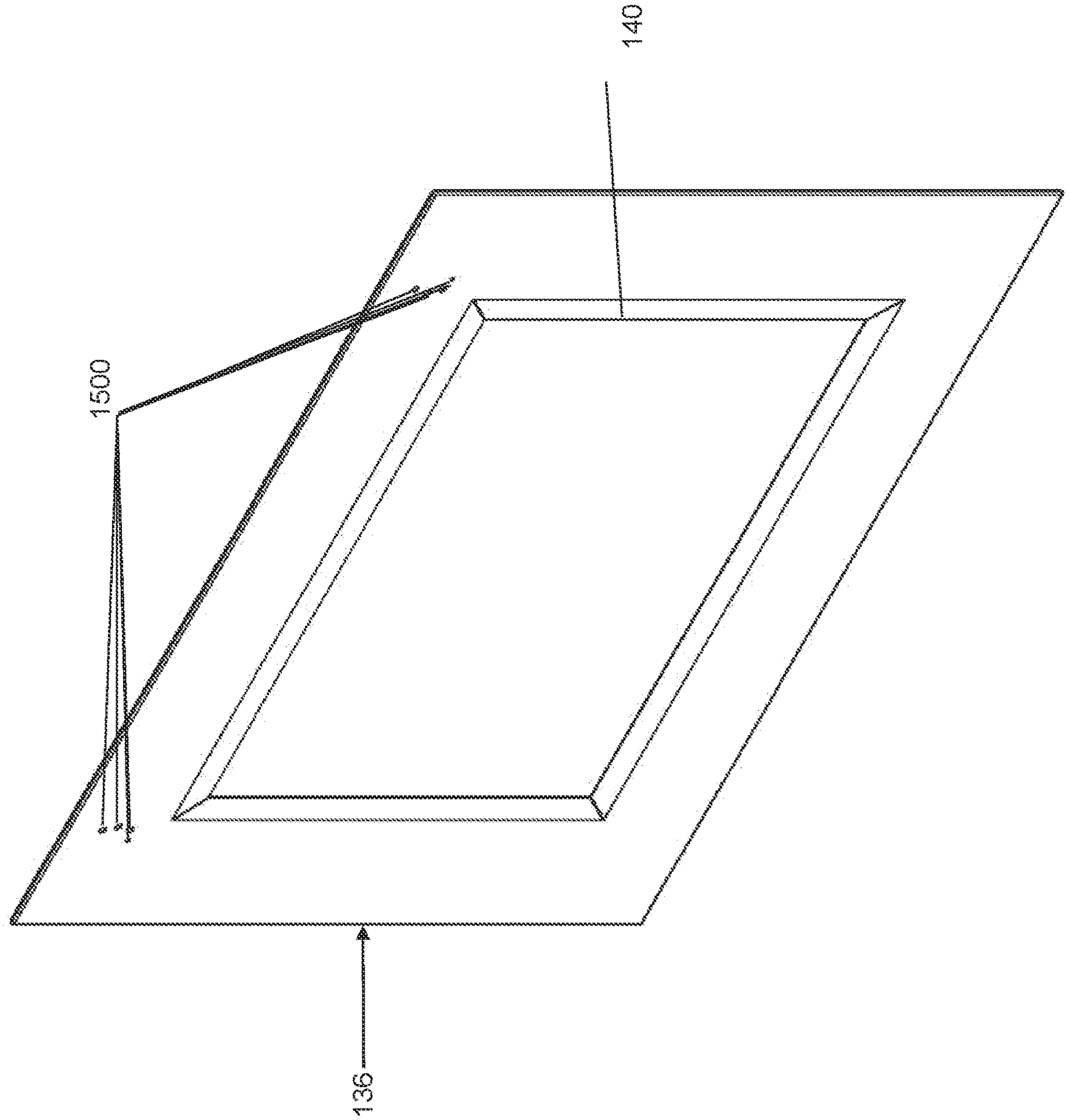
FIG. 15 depicts a top, front, right perspective view of a front panel frame of the oven door panel of FIG. 4 in accordance with an illustrative embodiment.

Referring to FIG. 15, a top, front, right perspective view of front panel frame 136 is shown in accordance with an illustrative embodiment. In an illustrative embodiment, front panel frame 136 is generally flat and formed of a coated metal or stainless-steel panel though other materials may be used. Front panel frame 136 may include handle mounting aperture walls 1500. A fastener may be inserted in one or more of the handle mounting aperture walls 1500 to mount handle 134 to a front face of front panel frame 136.

Figure 16:
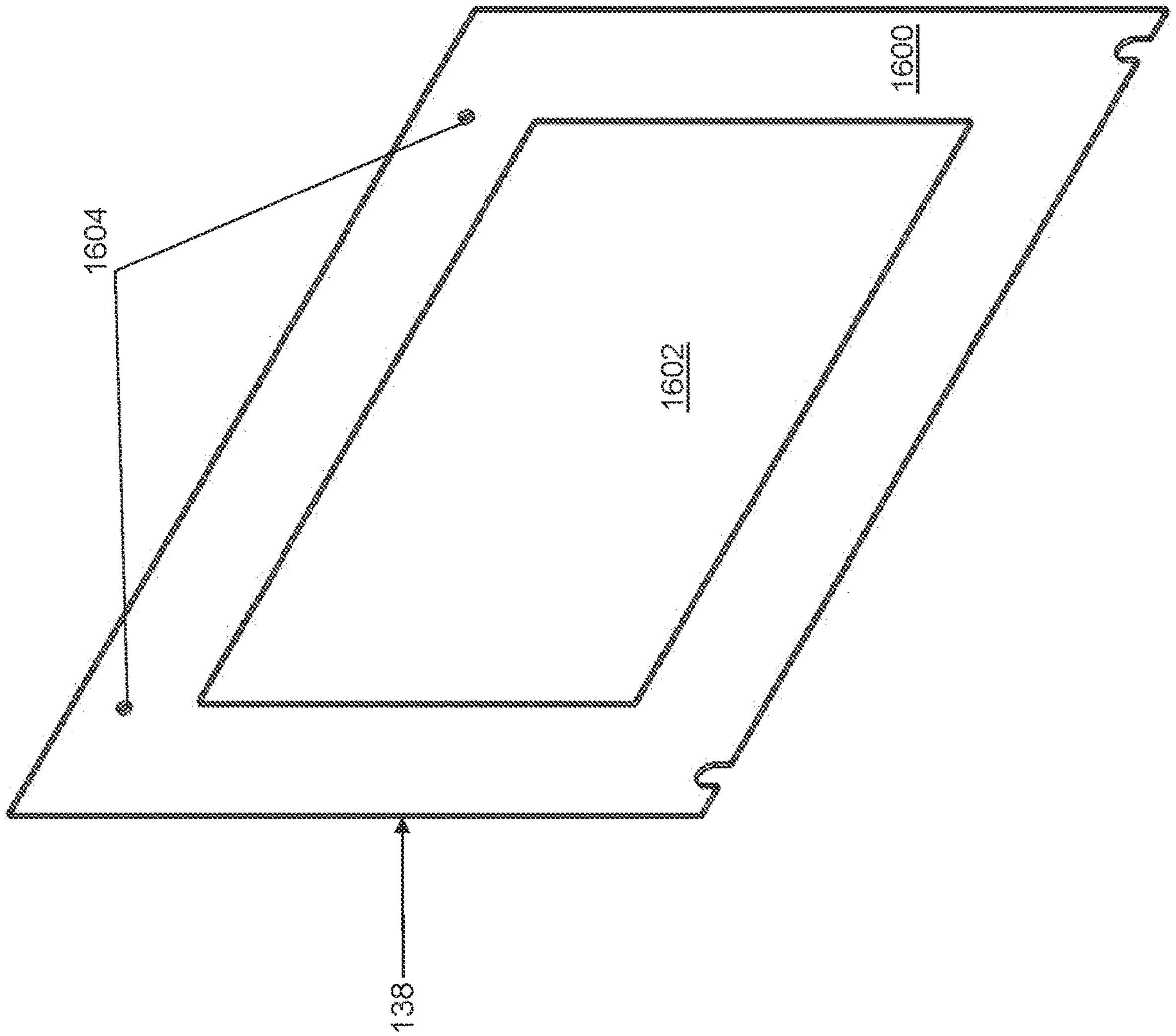
FIG. 16 depicts a top, front, right perspective view of a front panel glass of the oven door panel of FIG. 4 in accordance with an illustrative embodiment.

Referring to FIG. 16, a top, front, right perspective view of front panel glass sheet 138 is shown in accordance with an illustrative embodiment. Front panel glass sheet 138 may include an exterior frame 1600, an interior window 1602, and fastener aperture walls 1604. Front panel glass sheet 138 may be generally flat. In an illustrative embodiment, interior window 1602 is formed of a transparent material such as glass or plastic though other materials may be used. exterior frame 1600 may be formed of the same material or a different material than interior window 1602 and need not be transparent. Fastener aperture walls 1604 are formed through a top portion of exterior frame 1600. A fastener (not shown) may be inserted into each wall of fastener aperture walls 1604 to mount front panel glass sheet 138 to other components of top door 120.

Figure 17:
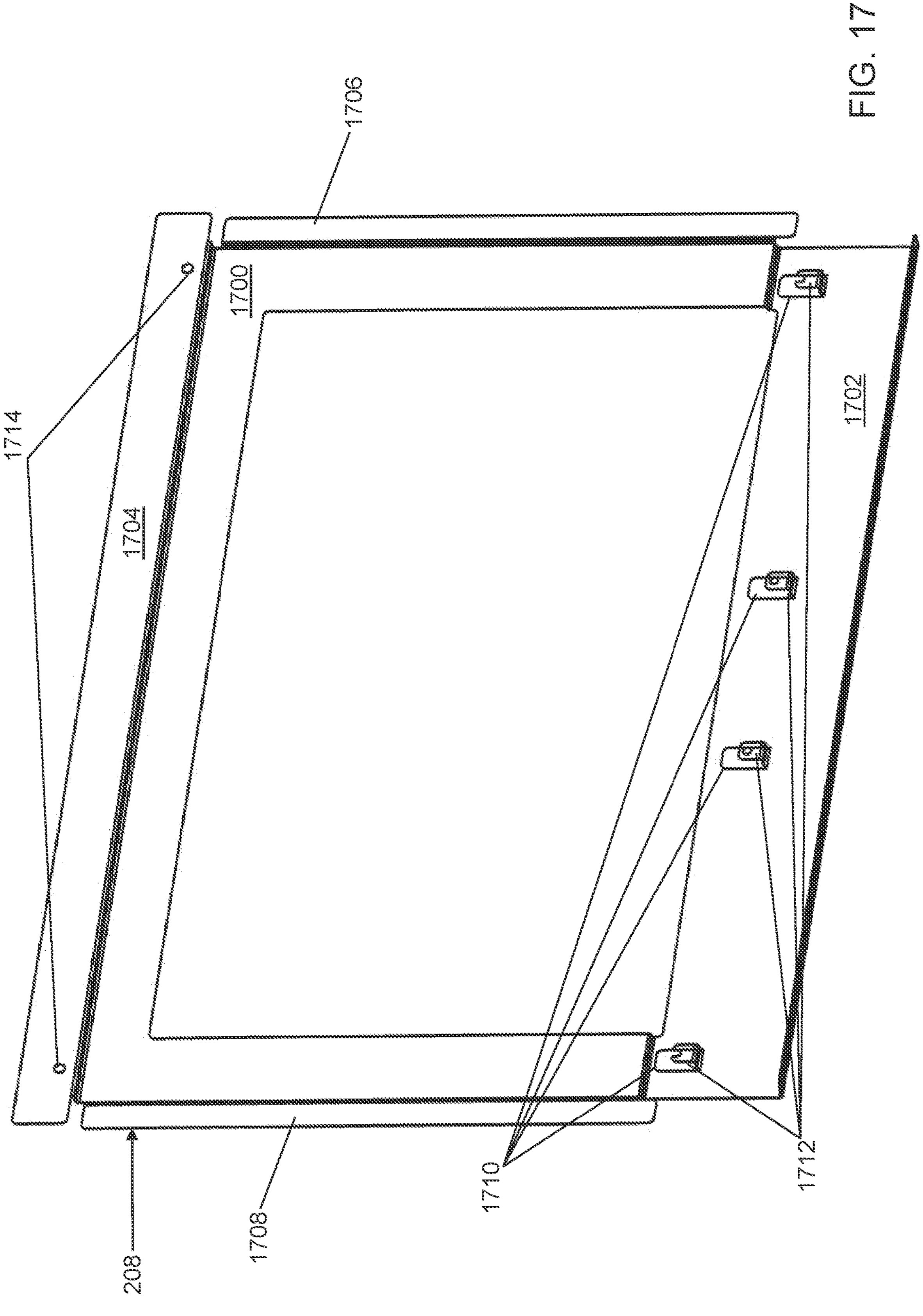
FIG. 17 depicts a front, right perspective view of the deflector glass panel of the oven door panel of FIG. 4 in accordance with an illustrative embodiment.

Referring to FIG. 17, a front, right perspective view of deflector glass panel 208 is shown in accordance with an illustrative embodiment. Deflector glass panel 208 may include a deflector frame 1700, a deflector bottom tab 1702, a deflector top tab 1704, a deflector right tab 1706, a deflector left tab 1708, hook aperture walls 1710, hooks 1712, and deflector aperture walls 1714. Deflector frame 1700 has an upside-down U-shape. Deflector frame 1700 and deflector bottom tab 1702 form a rectangular aperture through which items in the oven cavity can be seen. Deflector top tab 1704 extends upward away from a top edge of deflector frame 1700. Deflector right tab 1706 extends outward away from a right edge of deflector frame 1700. Deflector left tab 1708 extends outward away from a left edge of deflector frame 1700.

Hook aperture walls 1710 are formed through deflector bottom tab 1702 across deflector bottom tab 1702 from right to left. A hook of hooks 1712 extends inward from a lower portion of a respective aperture wall of hook aperture walls 1710 toward the oven cavity when top door 120 is mounted to top oven 102.

Deflector aperture walls 1714 are formed through deflector top tab 1704. A fastener (not shown) may be inserted into each wall of deflector aperture walls 1714 to mount front panel glass sheet 138 to other components of top door 120.

Figure 18A:
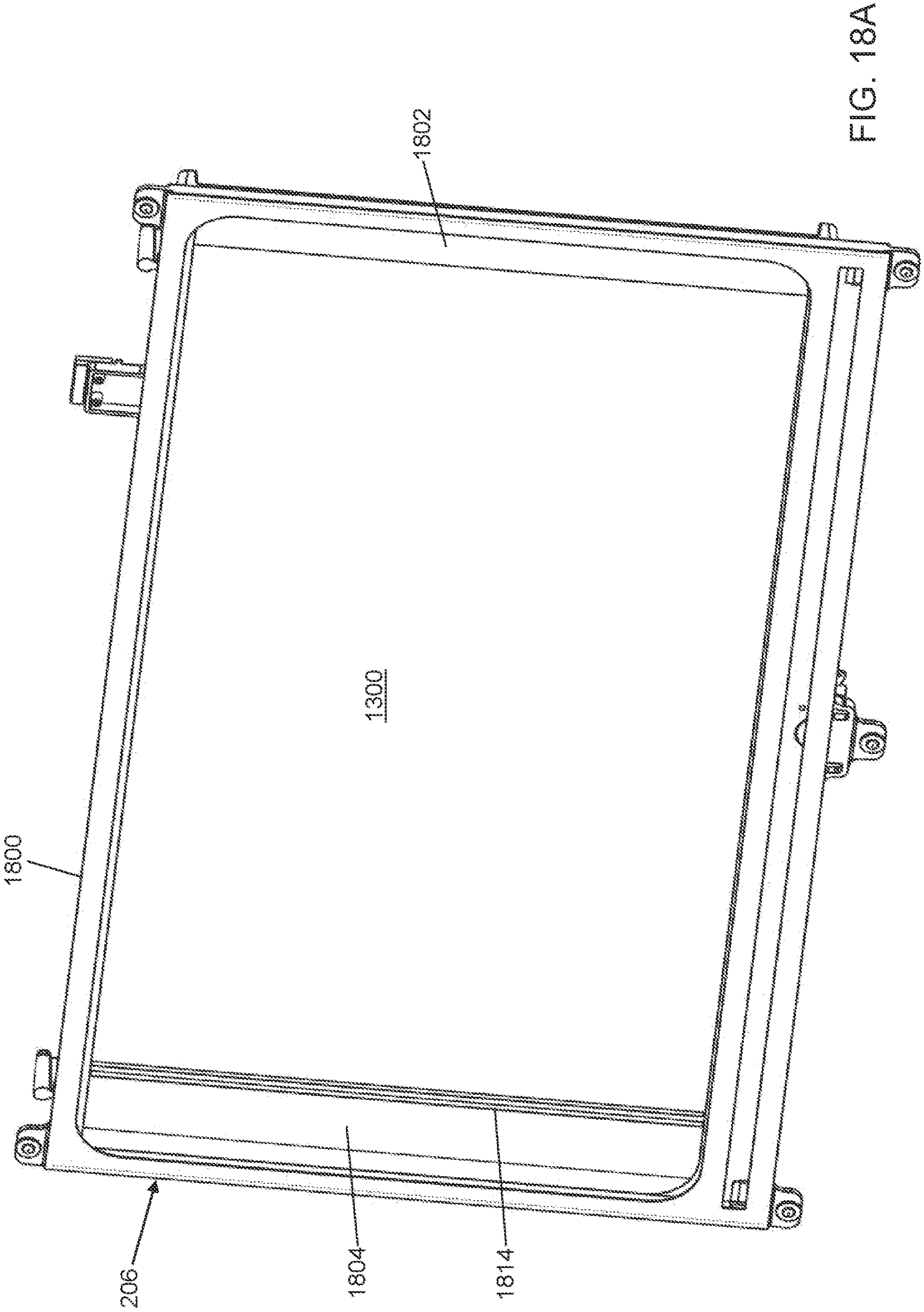
FIG. 18A depicts a back, right perspective view of the heated glass assembly of the oven door panel of FIG. 4 in accordance with an illustrative embodiment.
Figure 18B:
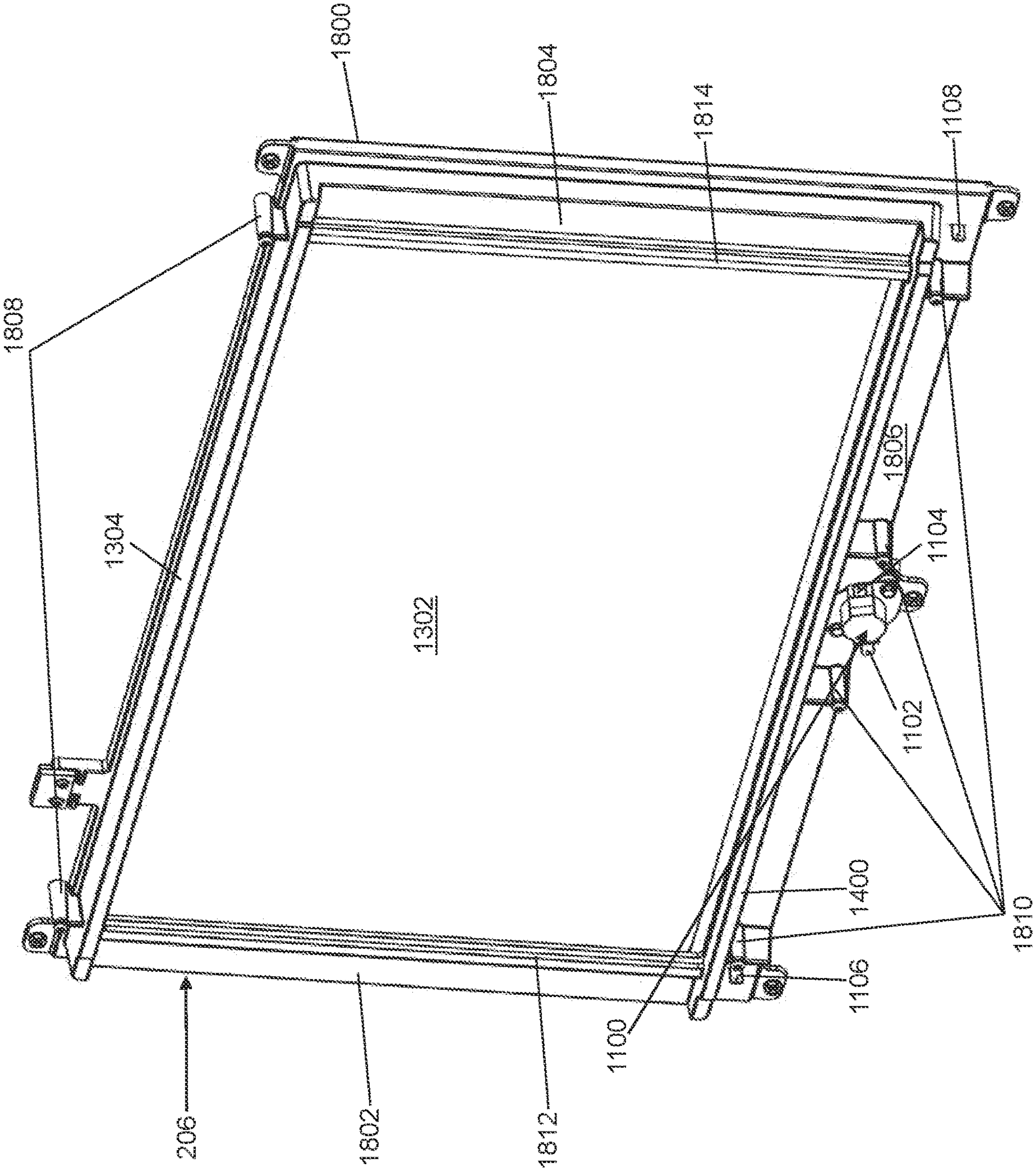
FIG. 18B depicts a top, front, left perspective view of the heated glass assembly of FIG. 18A in accordance with an illustrative embodiment.
Figure 19:
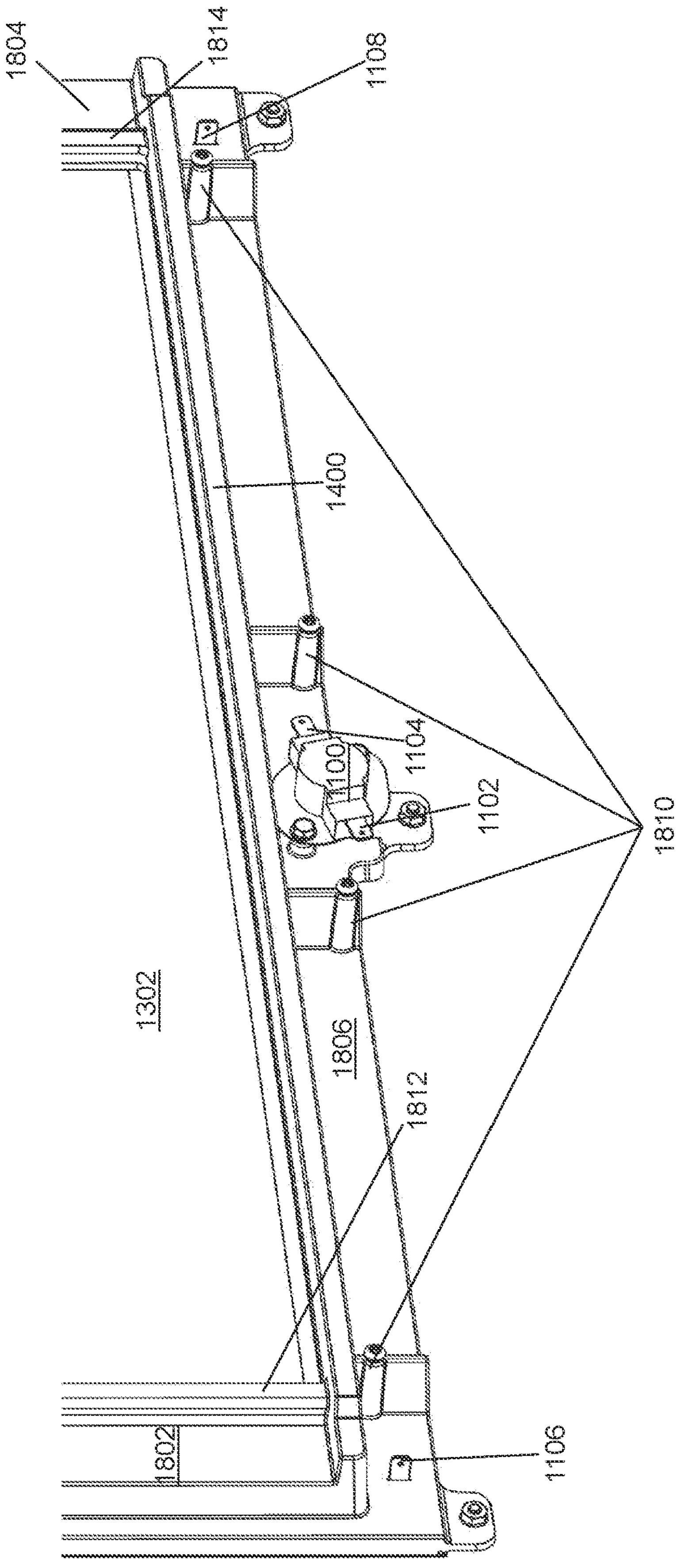
FIG. 19 depicts a front, right perspective view of a bottom portion of the heated glass assembly of FIG. 18A in accordance with an illustrative embodiment.

Referring to FIG. 18A, a back, right perspective view of heated glass assembly 206 is shown in accordance with an illustrative embodiment. Referring to FIG. 18B, a top, front, left perspective view of heated glass assembly 206 is shown in accordance with an illustrative embodiment. Referring to FIG. 19, a back, front perspective view of a bottom portion of heated glass assembly 206 is shown in accordance with an illustrative embodiment. Heated glass assembly 206 may include a back frame 1800, top frame 1304, bottom frame 1400, a left frame 1802, a right frame 1804, a bottom tab 1806, top nuts 1808, bottom nuts 1810, a left boundary wall 1812, and a right boundary wall 1814. Back frame 1800 forms a frame around an edge of cavity glass sheet 1300 that faces into the oven cavity.

Top frame 1304 extends generally perpendicularly adjacent and relative to a top edge of back frame 1800 away from the oven cavity and toward deflector glass panel 208. Bottom frame 1400 extends generally perpendicularly adjacent and relative to a bottom edge of back frame 1800 away from the oven cavity and toward deflector glass panel 208. Top frame 1304 forms a top frame that holds a top edge of middle glass sheet 1302 and a top edge of cavity glass sheet 1300. Bottom frame 1400 forms a bottom frame that holds a bottom edge of middle glass sheet 1302 and a bottom edge of cavity glass sheet 1300. Cavity glass sheet 1300 extends downward further than middle glass sheet 1302 past a bottom edge of bottom frame 1400 such that cavity glass sheet 1300 is positioned between bottom tab 1806 and a liner wall 2000 of door liner 204 (shown referring to FIG. 20).

Left boundary wall 1812 is formed along a right edge of left frame 1802 to hold a left edge of middle glass sheet 1302 and a left edge of cavity glass sheet 1300. Right boundary wall 1814 is formed along a left edge of right frame 1804 to hold a right edge of middle glass sheet 1302 and a right edge of cavity glass sheet 1300.

Left frame 1802 extends from a left edge of left boundary wall 1812. Right frame 1804 extends from a right edge of right boundary wall 1814. Bottom tab 1806 extends from a bottom portion of back frame 1800 below bottom frame 1400.

Top nuts 1808 are formed on a top surface of top frame 1304. A fastener (not shown) may be inserted into each nut of top nuts 1808 to mount heated glass assembly 206 to other components of top door 120. For example, a deflector aperture wall of deflector aperture walls 1714 aligns with a nut of top nuts 1808 such that a fastener inserted through a deflector aperture wall of deflector aperture walls 1714 is also inserted into a respective nut of top nuts 1808 to mount deflector glass panel 208 to heated glass assembly 206.

Bottom nuts 1810 are formed to extend generally perpendicularly from bottom tab 1806. A fastener (not shown) may be inserted into each nut of bottom nuts 1810 to mount heated glass assembly 206 to other components of top door 120. For example, a hook of hooks 1712 aligns with a nut of bottom nuts 1810 such that a fastener inserted into the nut is positioned to abut a top of a respective hook or inserted through an aperture wall formed through a respective hook to mount deflector glass panel 208 to heated glass assembly 206.

Figure 20:
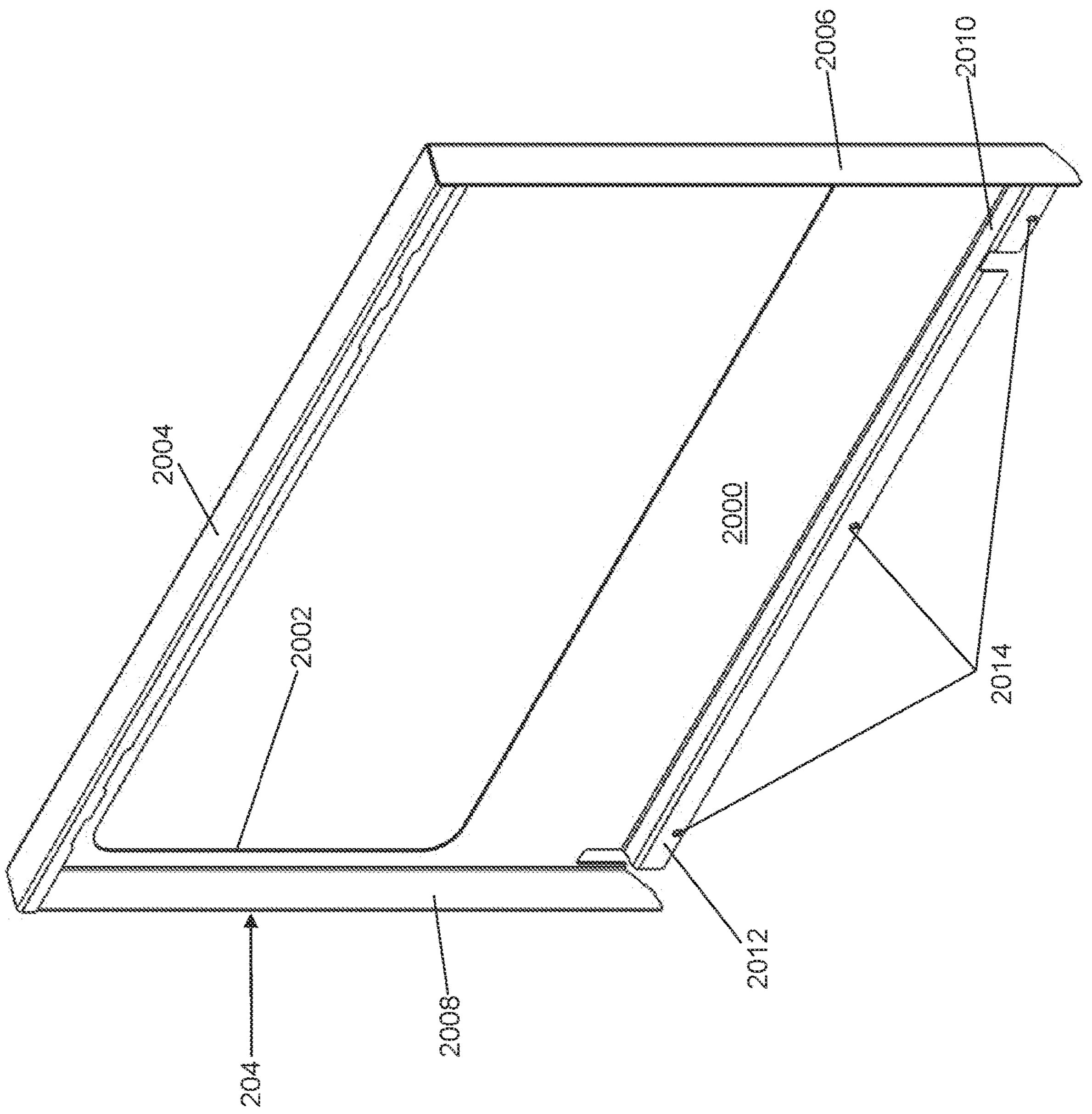
FIG. 20 depicts a top, front, right perspective view of the door liner of the oven door panel of FIG. 4 in accordance with an illustrative embodiment.

Referring to FIG. 20, a top, front, right perspective view of door liner 204 is shown in accordance with an illustrative embodiment. Door liner 204 may include liner wall 2000, a liner aperture wall 2002, a liner top tab 2004, a liner right tab 2006, a liner left tab 2008, a liner bottom tab 2010, a liner mounting tab 2012, and liner aperture walls 2014. Liner wall 2000 may be generally flat and formed of a coated metal or stainless-steel panel though other materials may be used. Liner aperture wall 2002 is formed through liner wall 2000 to define a window through which items in the oven cavity can be seen. The window is rectangular though the window may have other shapes. Liner top tab 2004 extends from a top edge of liner wall 2000 toward front panel frame 136.

Liner right tab 2006 extends from a right edge of liner wall 2000 toward front panel frame 136. Liner left tab 2008 extends from a left edge of liner wall 2000 toward front panel frame 136. Liner bottom tab 2010 extends from a bottom edge of liner wall 2000 toward front panel frame 136. Liner mounting tab 2012 extends downward from a front edge of liner bottom tab 2010 opposite liner wall 2000. Liner aperture walls 2014 are formed through liner mounting tab 2012. A fastener (not shown) may be inserted into each wall of liner aperture walls 2014 to mount door liner 204 to other components of top door 120.

Figure 21B:
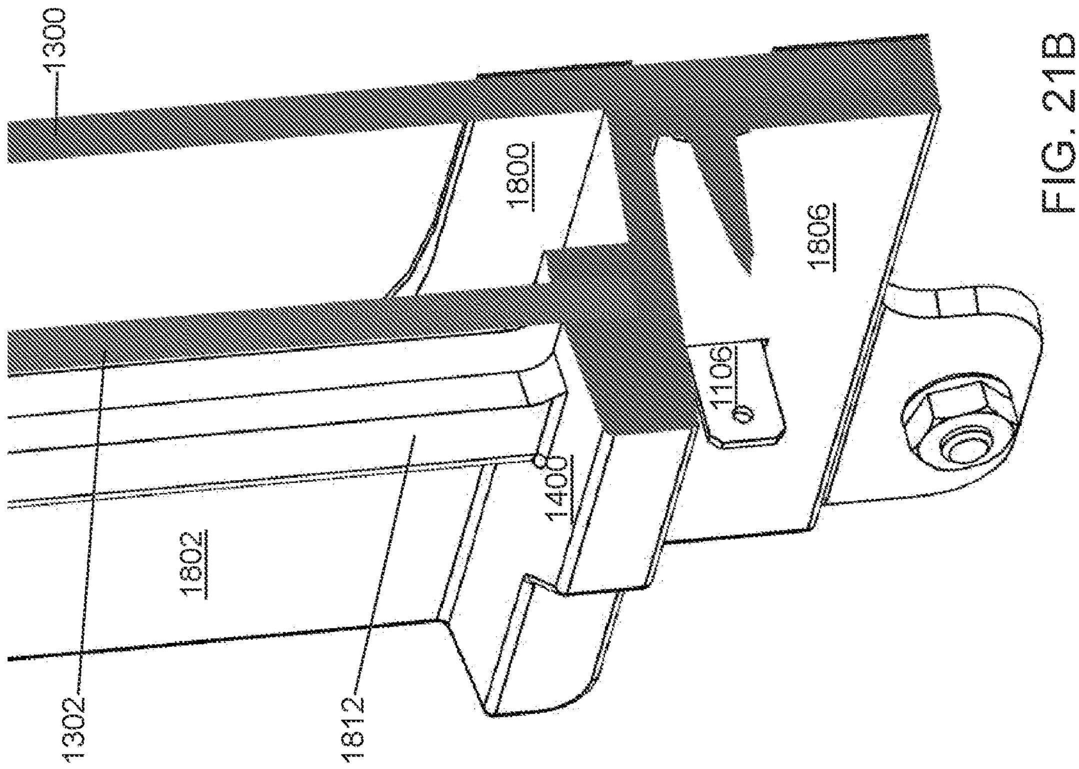
FIG. 21B depicts a first front, left perspective, cross-sectional view of the heated glass assembly of FIG. 21A in accordance with an illustrative embodiment.
Figure 21A:
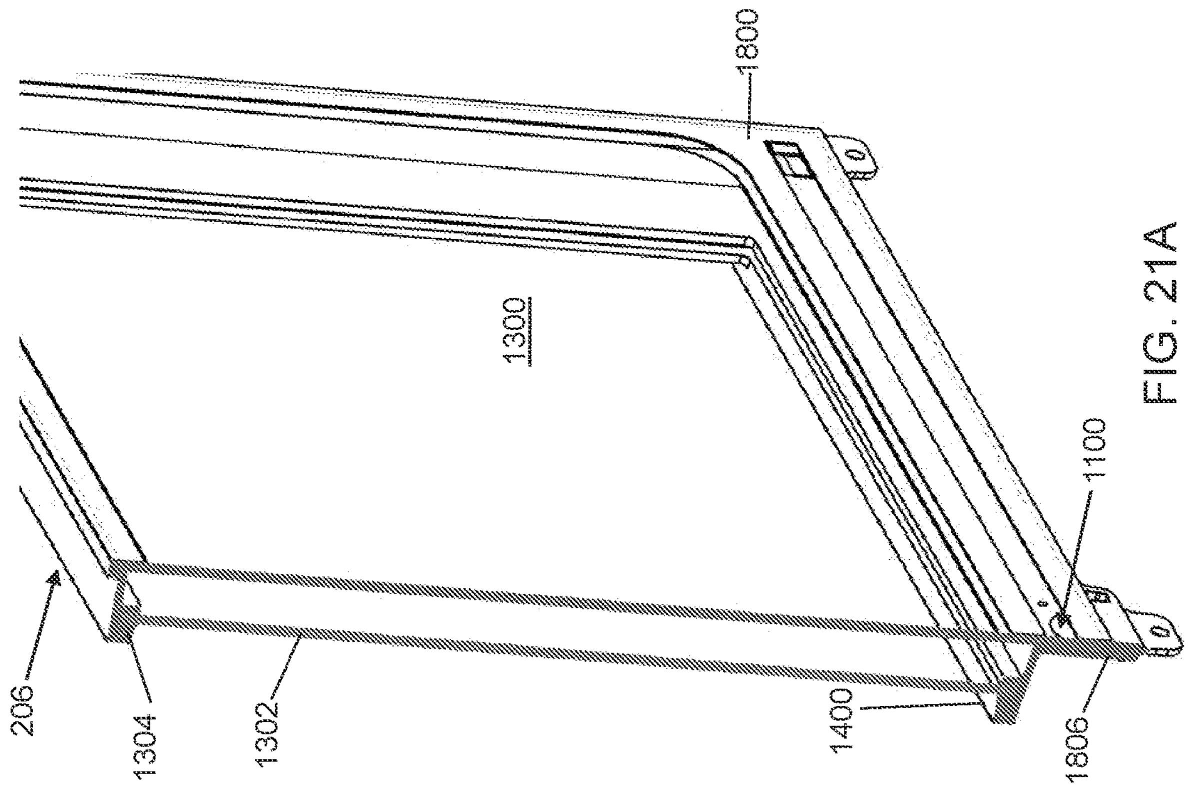
FIG. 21A depicts a top, back, left perspective, cross-sectional view of the heated glass assembly of FIG. 18A in accordance with an illustrative embodiment.
Figure 21D:
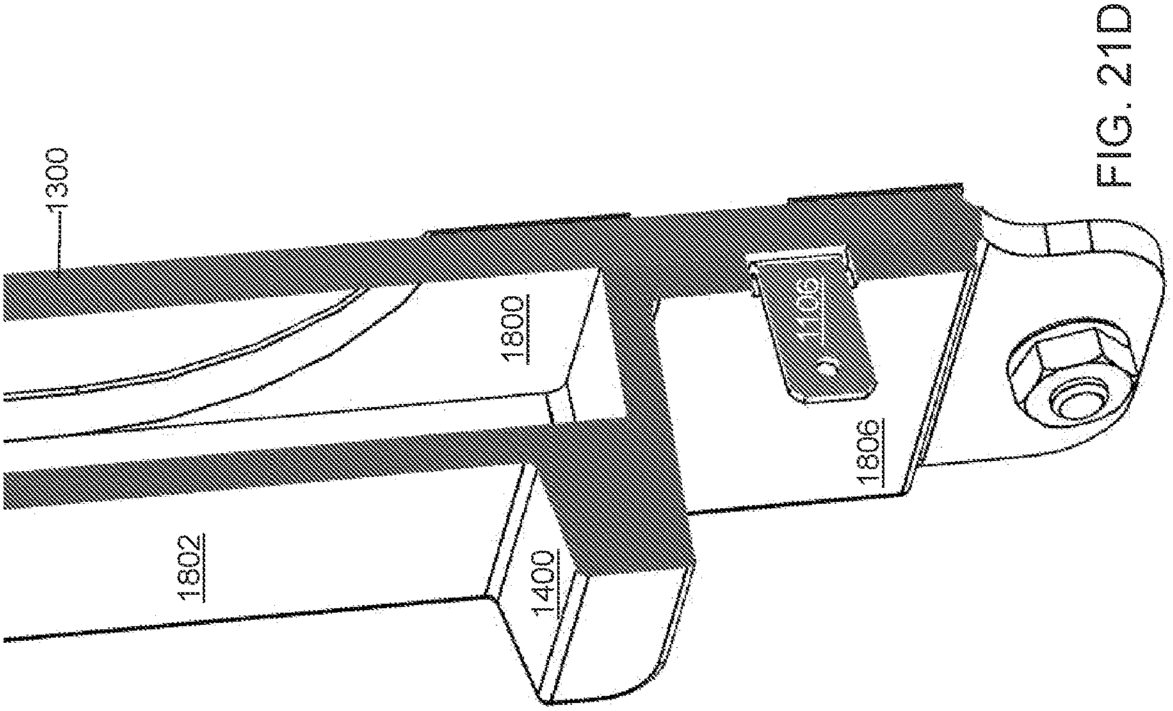
FIG. 21D depicts a third front, left perspective, cross-sectional view of the heated glass assembly of FIG. 21A in accordance with an illustrative embodiment.
Figure 21C:
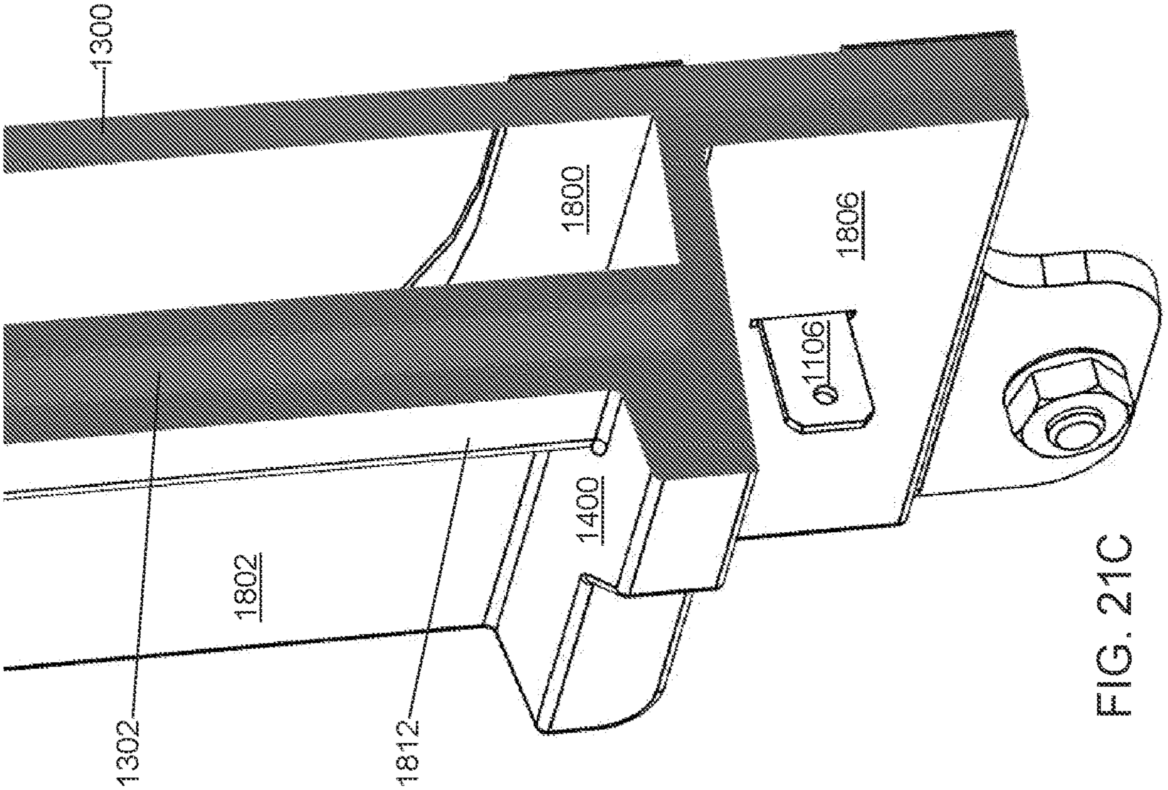
FIG. 21C depicts a second front, left perspective, cross-sectional view of the heated glass assembly of FIG. 21A in accordance with an illustrative embodiment.

Referring to FIG. 21A, a top, back, left perspective, cross-sectional view of heated glass assembly 206 is shown where the cross-section is vertically through approximately a center of cavity glass sheet 1300 as seen from the right in accordance with an illustrative embodiment. Referring to FIG. 21B, a first front, left perspective, cross-sectional view of heated glass assembly 206 is shown where the cross-section is vertically through a left most nut of bottom nuts 1810 just prior to left boundary wall 1812 as seen from the right in accordance with an illustrative embodiment. Referring to FIG. 21C, a second front, left perspective, cross-sectional view of heated glass assembly 206 is shown where the cross-section is vertically through left boundary wall 1812 as seen from the right in accordance with an illustrative embodiment. Referring to FIG. 21D, a third front, left perspective, cross-sectional view of heated glass assembly 206 is shown where the cross-section is vertically through first glass heater connector 1106 as seen from the right in accordance with an illustrative embodiment. Cavity glass sheet 1300 is wider from right to left and vertically from top to bottom than middle glass sheet 1302. Cavity glass sheet 1300 is electrically connected to first glass heater connector 1106 on a left side and to second glass heater connector 1108 on a right side.

Figure 22A:
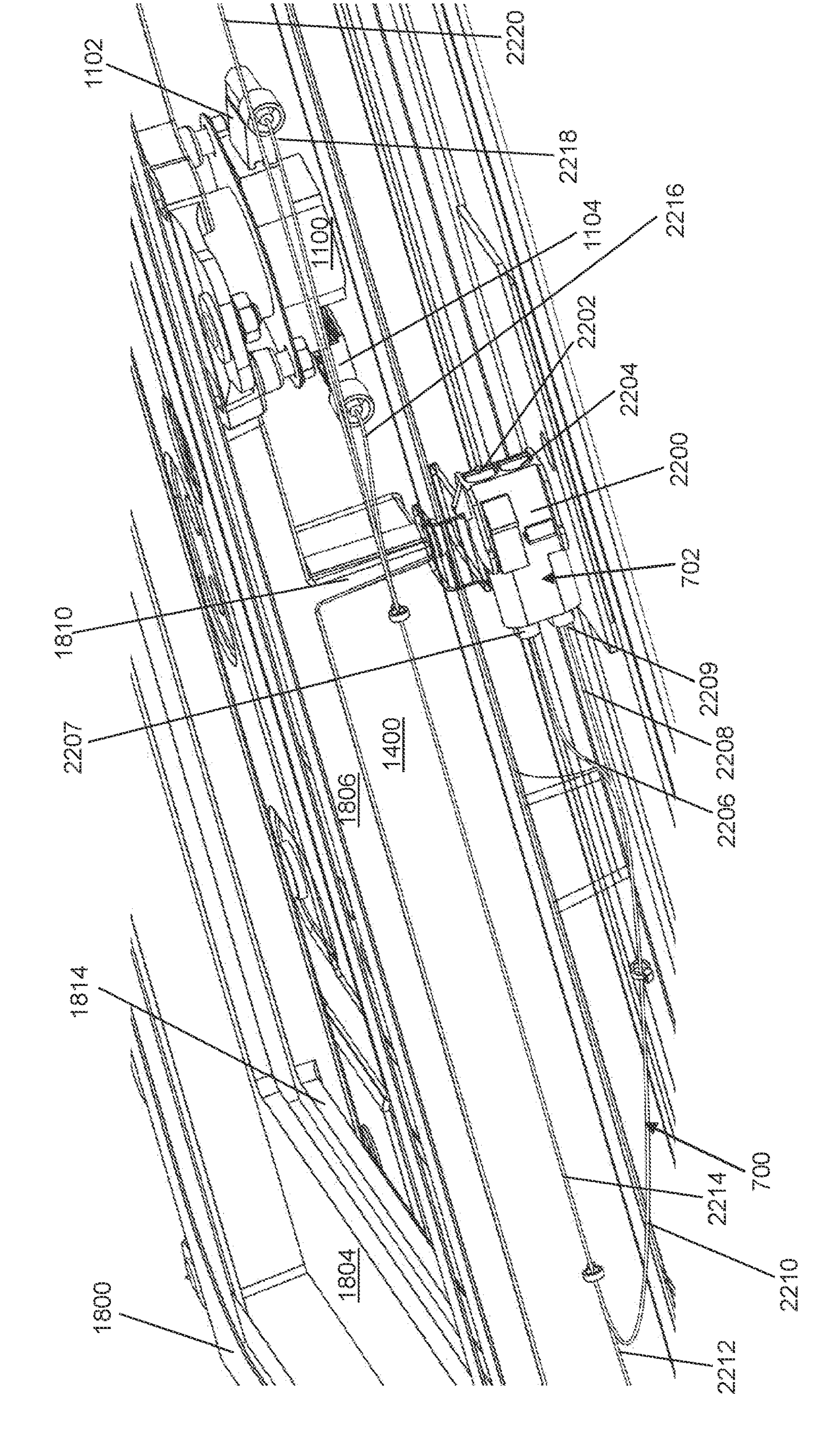
FIG. 22A depicts a zoomed bottom perspective view of the oven door panel of FIG. 4 in accordance with an illustrative embodiment.
Figure 22B:
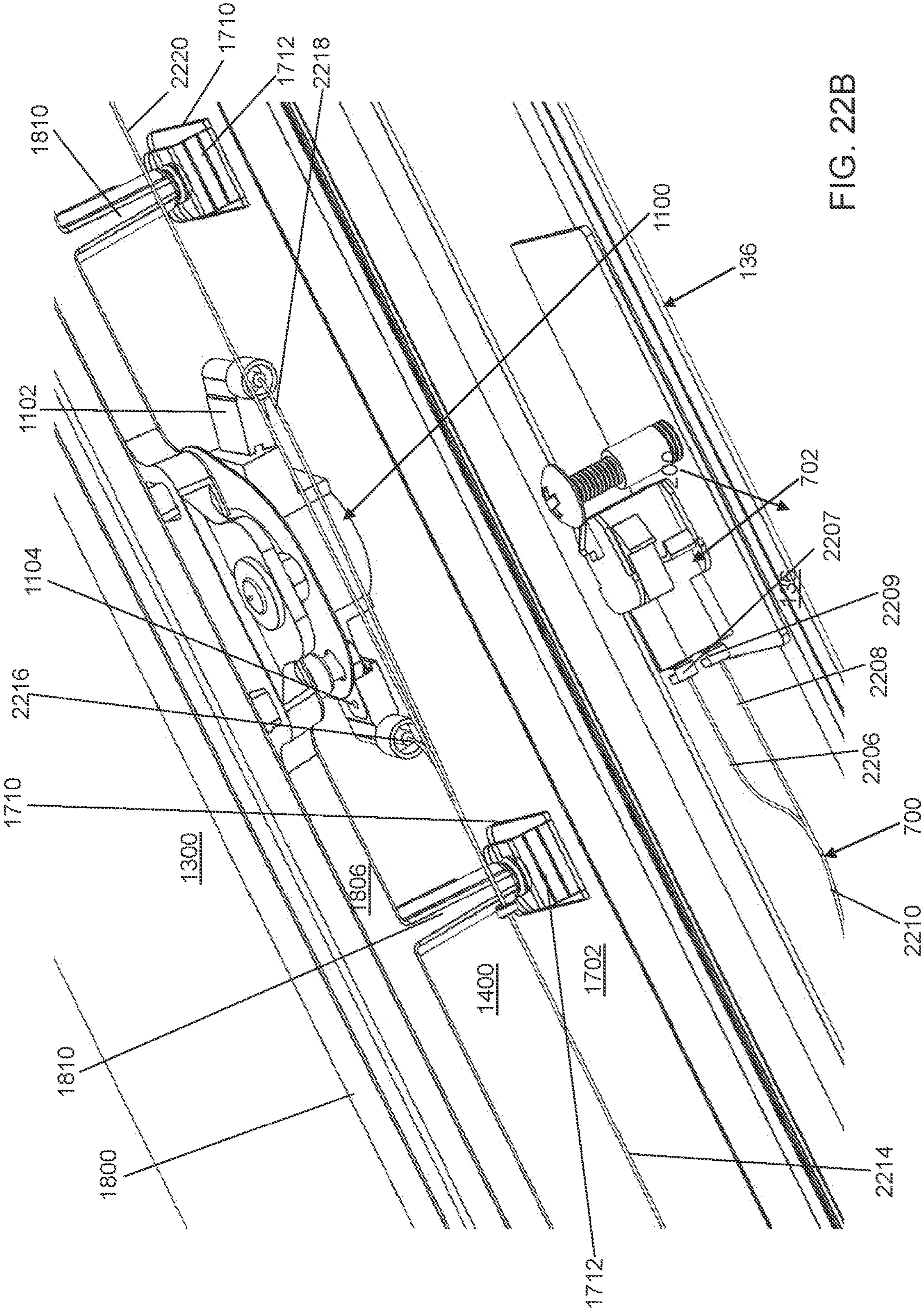
FIG. 22B depicts a second zoomed bottom perspective view of the oven door panel of FIG. 4 in accordance with an illustrative embodiment.

Referring to FIG. 22A, a zoomed bottom perspective view of top door 120 is shown with door liner 204 removed in accordance with an illustrative embodiment. Referring to FIG. 22B, a second zoomed bottom perspective view of top door 120 is shown with door liner 204 removed in accordance with an illustrative embodiment. Referring to FIG. 22C, a zoomed bottom, right perspective view of top door 120 is shown with door liner 204 removed in accordance with an illustrative embodiment. Referring to FIG. 22D, a zoomed bottom, left perspective view of top door 120 is shown with door liner 204 removed in accordance with an illustrative embodiment.

Electrical connector 702 may include a body 2200, a first female connector 2202, a second female connector 2204, a third female connector (not shown), and a fourth female connector (not shown). First female connector 2202, second female connector 2204, the third female connector, and the fourth female connector are formed within body 2200. Within body 2200, first female connector 2202 is electrically connected to the third female connector, and second female connector 2204 is electrically connected to the fourth female connector. A control wire (not shown) electrically connects a glass heater controller 2300 (shown referring to FIG. 23) to electrical connector 702 using first female connector 2202 and second female connector 2204. The control wire provides a current signal and/or a voltage signal and/or a power signal to heated glass assembly 206.

Wire harness 700 may include a first exit wire 2206, a second exit wire 2208, a first wire section 2210, a second wire section 2212, a third wire section 2214, a fourth wire section 2216, a fifth wire section 2218, and a sixth wire section 2220. First exit wire 2206 and second exit wire 2208 are wired to a first male connector 2207 and to a second male connector 2209, respectively, that are inserted into the third female connector and the fourth female connector, respectively.

Each wire section includes a first end and a second end that is opposite the first end. First wire section 2210 includes a first end connected to first exit wire 2206 and second exit wire 2208 and a second end connected to a first end of second wire section 2212 and a first end of third wire section 2214. Second wire section 2212 includes a first end connected to the second end of first wire section 2210 and a second end connected to second glass heater connector 1108. Third wire section 2214 includes the first end connected to the first end of second wire section 2212 and a second end connected to a first end of fourth wire section 2216, to a first end of fifth wire section 2218, and to a first end of sixth wire section 2220. Fourth wire section 2216 includes the first end connected to the second end of third wire section 2214 and a second end connected to second thermal cutout connector 1104. Fifth wire section 2218 includes the first end connected to the second end of third wire section 2214 and a second end connected to first thermal cutout connector 1102. Sixth wire section 2220 includes the first end connected to the second end of third wire section 2214 and a second end connected to first glass heater connector 1106.

An electrical current provided to first exit wire 2206 and to second exit wire 2208 and thereby to first glass heater connector 1106 and to second glass heater connector 1108 under control of glass heater controller 2300 triggers a flow of current in a conductive coating on a first surface of cavity glass sheet 1300 that faces middle glass sheet 1302. For example, the coating may be an indium tin oxide coating that acts as a standard resistance heater when power is applied across the coating. For example, a screen-printed bus bar may be formed along a vertical edge of cavity glass sheet 1300 that is connected to one of first glass heater connector 1106 or second glass heater connector 1108 that provides the current to the bus bar. For example, the screen-printed bus bar may be connected to one of first glass heater connector 1106 or second glass heater connector 1108 using a spring spade terminal. Middle glass sheet 1302 acts as a reflector of the heat generated by the coating and the oven cavity.

In an illustrative embodiment, first glass heater connector 1106 and/or second glass heater connector 1108 are made of a spring material that creates physical pressure against the bus bar to create an electrical connection. First glass heater connector 1106 and/or second glass heater connector 1108 may include a standard spade connector exposed to allow connection to wire harness 700.

The coating heats cavity glass sheet 1300 to reduce or to eliminate condensation that forms on cavity glass sheet 1300 when top oven 102 is operated in a steam oven mode or other mode in which condensation is created as described further below. For illustration, a steam oven mode, a steam convection mode, a reheat mode, a convection humid mode, a proof mode, a defrost mode, a sous-vide mode, etc. may create condensation that may form on cavity glass sheet 1300. This typically means holding cavity glass sheet 1300 above the oven cavity temperature value when a desired relative humidity is 100%. When the desired relative humidity is less than 100%, a dewpoint can be computed from steam/psychrometric tables as described further below.

An electrical current provided to first exit wire 2206 and to second exit wire 2208 and thereby to first thermal cutout connector 1102 and to second thermal cutout connector 1104 under control of glass heater controller 2300. Thermal cutout switch 1100 directly contacts cavity glass sheet 1300 to detect when a temperature of cavity glass sheet 1300 exceeds a safety threshold and to cut the power to first glass heater connector 1106 and to second glass heater connector 1108 when this occurs. Thermal cutout switch 1100 protects cavity glass sheet 1300 from overheating and may be a mechanical switch.

Figure 23:
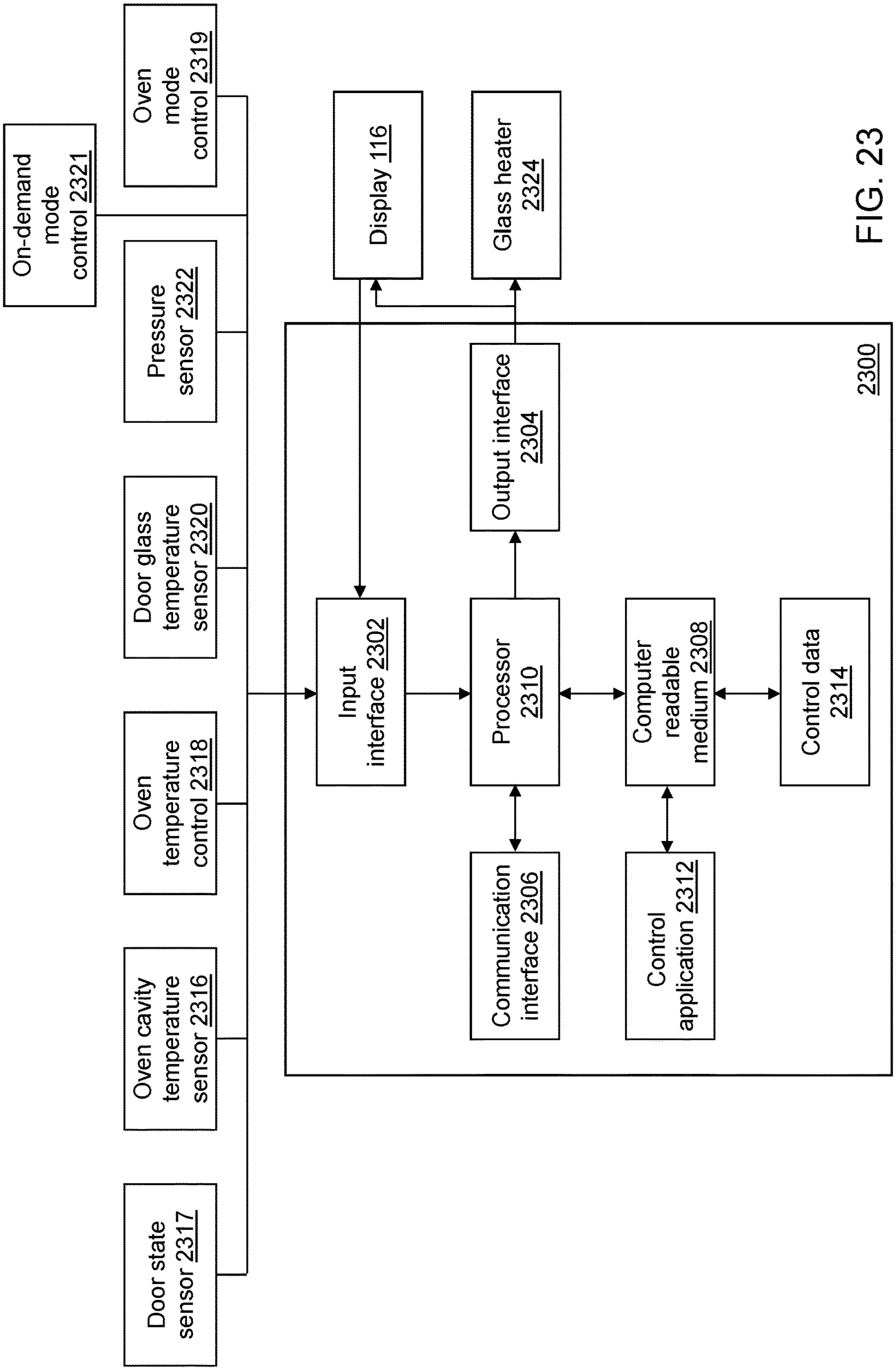
FIG. 23 depicts a block diagram of a glass heater controller of the heated glass assembly in accordance with an illustrative embodiment.

Referring to FIG. 23, a block diagram of glass heater controller 2300 is shown in accordance with an illustrative embodiment. Glass heater controller 2300 may include an input interface 2302, an output interface 2304, a communication interface 2306, a non-transitory computer-readable medium 2308, a processor 2310, control application 2312, and control data 2314. Control application 2312 determines a control current, control voltage, and/or control power to provide to first exit wire 2206 and to second exit wire 2208 of heated glass assembly 206. Fewer, different, and/or additional components may be incorporated into glass heater controller 2300. Glass heater controller 2300 may be integrated with other controllers of top oven 102. For example, other controllers may be configured to control operation of the heating functions based on the selected cooking mode and the selected oven temperature setpoint value.

Input interface 2302 provides an interface for receiving information from the user or another device for entry into glass heater controller 2300 as understood by those skilled in the art. Input interface 2302 may interface with various input technologies including, but not limited to, an oven cavity temperature sensor 2316, a door state sensor 2317, an oven temperature control 2318, an oven mode control 2319, a door glass temperature sensor 2320, an on-demand mode control 2321, a pressure sensor 2322, etc. to allow the user to enter information into glass heater controller 2300 or to detect a state of top oven 102.

The same interface may support both input interface 2302 and output interface 2304. For example, display 116 comprising a touch screen provides a mechanism for user input and for presentation of output to the user. Glass heater controller 2300 may have one or more input interfaces that use the same or a different input interface technology. The input interface technology further may be accessible by glass heater controller 2300 through communication interface 2306.

Output interface 2304 provides an interface for outputting information for review by a user of glass heater controller 2300 and/or for use by another application or device. For example, output interface 2304 may interface with various output technologies including, but not limited to, display 116, a glass heater 2324, etc. Heated glass assembly 206 is an illustrative glass heater 2324. A power of glass heater 2324 can be varied using a time-based duty cycle or by varying the voltage applied across cavity glass sheet 1300. Glass heater controller 2300 may have one or more output interfaces that use the same or a different output interface technology. The output interface technology further may be accessible by glass heater controller 2300 through communication interface 2306.

Communication interface 2306 provides an interface for receiving and transmitting data between devices using various protocols, transmission technologies, and media as understood by those skilled in the art. Communication interface 2306 may support communication using various transmission media that may be wired and/or wireless. Glass heater controller 2300 may have one or more communication interfaces that use the same or a different communication interface technology. For example, glass heater controller 2300 may support communication using an Ethernet port, a Bluetooth® antenna, a telephone jack, a USB port, etc.

Computer-readable medium 2308 is an electronic holding place or storage for information so the information can be accessed by processor 2310 as understood by those skilled in the art. Computer-readable medium 2308 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Glass heater controller 2300 may have one or more computer-readable media that use the same or a different memory media technology. For example, computer-readable medium 2308 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Glass heater controller 2300 also may have one or more drives that support the loading of a memory media such as a CD, DVD, an external hard drive, etc. One or more external hard drives or other devices further may be connected to glass heater controller 2300 using communication interface 2306.

Processor 2310 executes instructions as understood by those skilled in the art. The instructions may be carried out by a special purpose computer, logic circuits, or hardware circuits. Processor 2310 may be implemented in hardware and/or firmware. Processor 2310 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 2310 operably couples with input interface 2302, with output interface 2304, with communication interface 2306, and with computer-readable medium 2308 to receive, to send, and to process information. Processor 2310 may retrieve a set of instructions from a permanent memory device and copy the instructions in an executable form to a temporary memory device that is generally some form of RAM. Glass heater controller 2300 may include a plurality of processors that use the same or a different processing technology.

Control application 2312 may perform operations associated with determining the control current, control voltage, and/or control power to provide to first exit wire 2206 and to second exit wire 2208 of heated glass assembly 206 to control an amount of heat generated by heated glass assembly 206 to reduce or to eliminate condensation based on a cooking mode, an oven temperature setpoint, an oven cavity temperature, a cooking phase, an open or a closed state of top door 120, an on-demand cooking mode of operations, etc. The temperature of cavity glass sheet 1300 may be controlled by control application 2312 to prevent condensation while not heating cavity glass sheet 1300 such that heat from cavity glass sheet 1300 impacts cooking performance of top oven 102. For example, control application 2312 may be configured to hold the temperature of cavity glass sheet 1300 just above a dew point. Some or all of the operations described herein may be embodied in control application 2312. The operations may be implemented using hardware, firmware, software, or any combination of these methods.

Referring to the example embodiment of FIG. 23, control application 2312 is implemented in software (comprised of computer-readable and/or computer-executable instructions) stored in computer-readable medium 2308 and accessible by processor 2310 for execution of the instructions that embody the operations of control application 2312. Control application 2312 may be written using one or more programming languages, assembly languages, scripting languages, etc.

Oven cavity temperature sensor 2316, door glass temperature sensor 2320, pressure sensor 2322 may measure a physical quantity in an environment to which a respective sensor is associated and generate a corresponding measurement datum value. For example, oven cavity temperature sensor 2316 may be located in or adjacent to the oven cavity to measure a current temperature in the oven cavity as understood by a person of skill in the art. Door state sensor 2317 may be located to detect whether top door 120 is in an open-state or a closed-state. top oven mode knob 108. Door glass temperature sensor 2320 may be located on or adjacent to cavity glass sheet 1300 to measure a current temperature of the cavity glass. Various types of temperature sensors may be used for door glass temperature sensor 2320 including a thermocouple, a resistance temperature detector, an infrared sensor, etc. Pressure sensor 2322 may be located on or adjacent to top oven 102 to measure a current atmospheric pressure of the environment in which top oven 102 is located.

For illustration, oven temperature control 2318 may be top oven temperature control knob 110 that is used to indicate a desired cooking temperature. For illustration, oven mode control 2319 may be top oven temperature control knob 110 that is used to indicate a desired cooking mode. For illustration, on-demand mode control 2321 may be an on-demand mode knob or button (not shown) or other user selectable selector such as included in the user-interface of top oven 102 or of double oven 100.

Referring to FIGS. 24A, 24B, 24C, 24D, and 24E, example operations associated with control application 2312 are described. Additional, fewer, or different operations may be performed depending on the embodiment of control application 2312. The order of presentation of the operations of FIGS. 24A, 24B, 24C, 24D, and 24E is not intended to be limiting. Some of the operations may not be performed in some embodiments. Although some of the operational flows are presented in sequence, the various operations may be performed in various repetitions and/or in other orders than those that are illustrated. Some of the operational flows further may be performed in parallel, for example, using a plurality of threads.

Figure 24A:
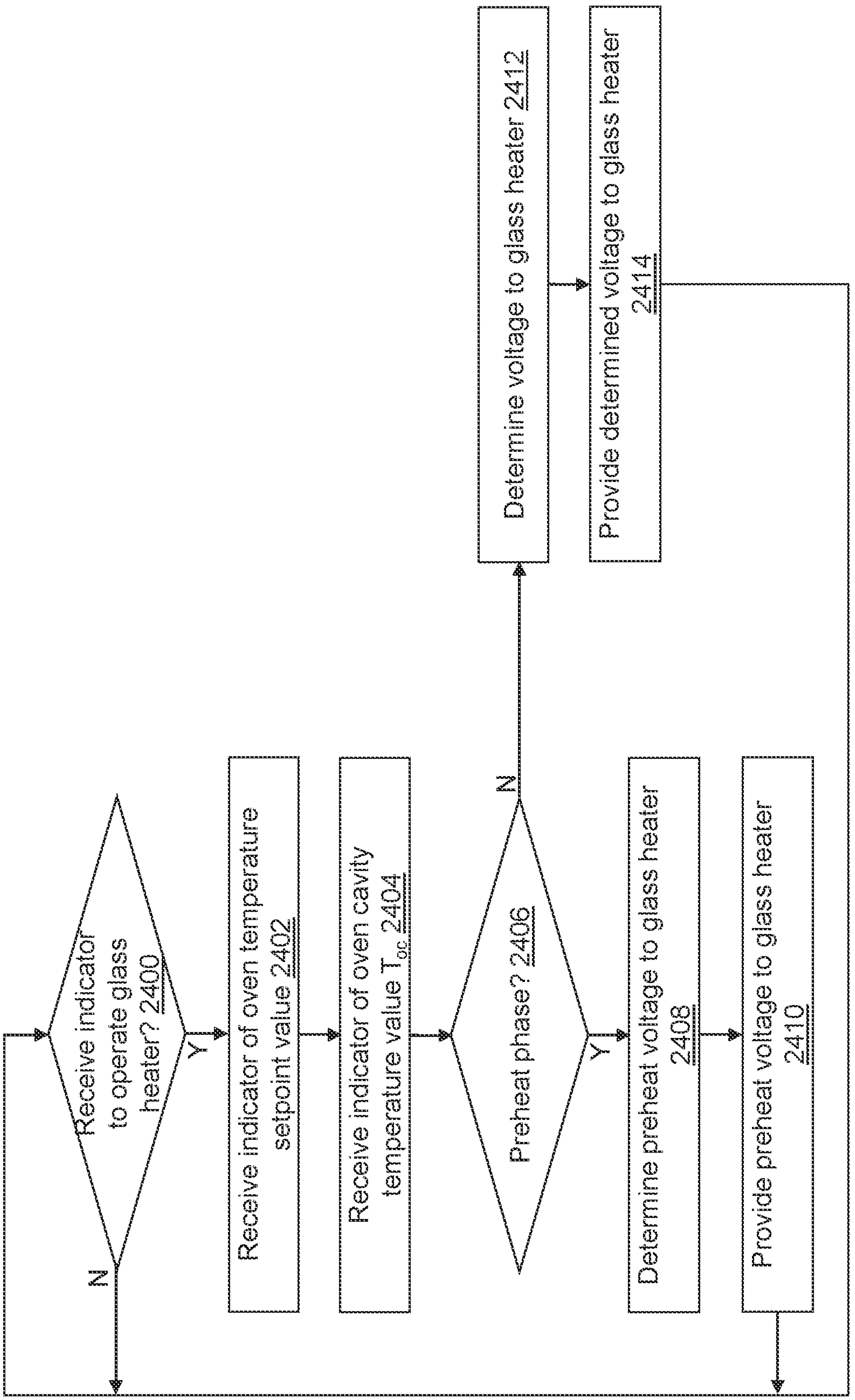
FIGS. 24A, 24B, 24C, 24D, and 24E depict flow diagrams illustrating examples of operations performed by the glass heater controller of FIG. 23 in accordance with an illustrative embodiment.

Referring to FIG. 24A, in an operation 2400, a determination is made concerning whether a first indicator is received to indicate that glass heater 2324 should be operated to the on-state. When the first indicator is received, processing continues in operation 2402. When the first indicator is not received, processing continues in operation 2400 to continue to wait for receipt of the first indicator. For example, the first indicator to indicate that glass heater 2324 should be operated to the on-state may be received when top oven 102 is in the on-state, when top door 120 is closed, and/or when a cooking mode is a mode that may generate condensation. In an alternative embodiment, glass heater 2324 may be operated to the on-state regardless of the whether top door 120 is open or closed. In an alternative embodiment, glass heater 2324 may be operated to the on-state regardless of the selected cooking mode or when other cooking modes such as defrost or sous vide are selected.

An indicator may indicate one or more user selections from a user interface, one or more data entries into a data field of the user interface, one or more data items read from computer-readable medium 2308, or one or more data items otherwise defined with one or more default values, one or more signal values received from another device or controller of top oven 120, etc. that are received as an input by control application 2312. Control application 2312 or another controller of top oven 102 or of double oven 100 may control presentation of the user interface and receive selections selected in the user interface. The first indicator may be received from the oven controller or directly based on integration between the one or more controllers of top oven 102 or of double oven 100. For example, the on-state may be indicated when either or both of oven temperature control 2318 or oven mode control 2319 provide a signal indicating the on-state. For illustration, the on-state may be indicated when either of top oven mode knob 108 or top oven temperature control knob 110 is used by a user to operate top oven 102. The user may further control operation of the oven using display 116 or another control. For example, top door 120 may be indicated as closed when door state sensor 2317 indicates that top door 120 is closed. For example, the steam mode may be indicated when oven mode control 2319 provides a signal indicating the steam mode. For illustration, the steam mode may be indicated based on a user selection using top oven mode knob 108. The oven controller may determine that the first indicator is sent to glass heater controller 2300 depending on integration between the oven controller and glass heater controller 2300.

In an operation 2402, a second indicator may be received that indicates the oven temperature setpoint value. For example, the oven controller may receive a signal indicating the oven temperature setpoint selected by the user using top oven temperature control knob 110. The second indicator may be received from the oven controller or directly based on integration between the one or more controllers of top oven 102.

In an operation 2404, a third indicator may be received that indicates the oven cavity temperature value $T_{oc}$. For example, the oven controller may receive a signal indicating a current cavity temperature from oven cavity temperature sensor 2316. The third indicator may be received from the oven controller or directly based on integration between the one or more controllers of top oven 102.

In an operation 2406, a determination is made concerning whether top oven 102 is in a preheat phase of operation. For example, a preheat phase is defined as a phase during which top oven 102 is heating, but has not yet reached the indicated oven temperature setpoint value based on the oven cavity temperature value $T_{oc}$. When top oven 102 is in the preheat phase, processing continues in an operation 2408. When top oven 102 is not in the preheat phase, processing continues in an operation 2412.

In operation 2408, a preheat voltage is determined to provide to glass heater 2324. In an illustrative embodiment, cavity glass sheet 1300 reaches an equilibrium temperature that correlates to the voltage provided at a given oven cavity temperature value $T_{oc}$ and a given voltage. For example, cavity glass sheet 1300 may be powered at a higher power level to increase the glass temperature more rapidly than the oven cavity temperature.

In an operation 2410, the preheat voltage determined in operation 2408 is provided to glass heater 2324, and processing continues in operation 2400. For example, a triode for alternating current may be used to control an average current flowing into first glass heater connector 1106 and/or second glass heater connector 1108 based on the determined preheat voltage.

In operation 2412, a voltage is determined to provide to glass heater 2324. For example, the voltage may be determined by correlating to the indicated oven temperature setpoint value. The voltage also may be based on a relative humidity. For example, a user could set an oven humidity setpoint in addition to the temperature setpoint. If the steam generation rate and mixing with dry air is at a desirable rate, condensation will not occur below a lower temperature than a dewpoint calculated for a saturated state.

For illustration, a predefined setpoint table may be read from control data 2314 stored in non-transitory computer-readable medium 2308. The setpoint table may define a voltage as a function of the indicated oven temperature setpoint value. In an alternative embodiment, the setpoint table may define a voltage percentage as a function of the indicated oven temperature setpoint value. The voltage may be determined using the voltage percentage multiplied by a predefined maximum voltage value that may be read from control data 2314 stored in non-transitory computer-readable medium 2308. An illustrative setpoint table is shown in Table 1 below.

TABLE 1

| Setpoint value | Voltage % |
|---|---|
| 350-450° Fahrenheit (F) | 0% |
| 250-350° F. | 35% |
| 150-250° F. | 25% |
| 90-150° F. | 15% |

As another example, the voltage may be determined using a predefined equation that relates the indicated oven temperature setpoint value to the voltage or the voltage percentage. For illustration, a curve could be fit to the data points in Table 1, where an equation is defined from the curve fit as understood by a person of skill in the art. As another example, the voltage may be determined using a predefined equation that relates the indicated oven temperature setpoint value to the voltage or the voltage percentage Similar to operation 2410, in an operation 2414, the voltage determined in operation 2412 is provided to glass heater 2324, for example, using the triode to control the average current flowing into first glass heater connector 1106 and/or second glass heater connector 1108 based on the determined voltage, and processing continues in operation 2400 of FIG. 24A.

Figure 24B:
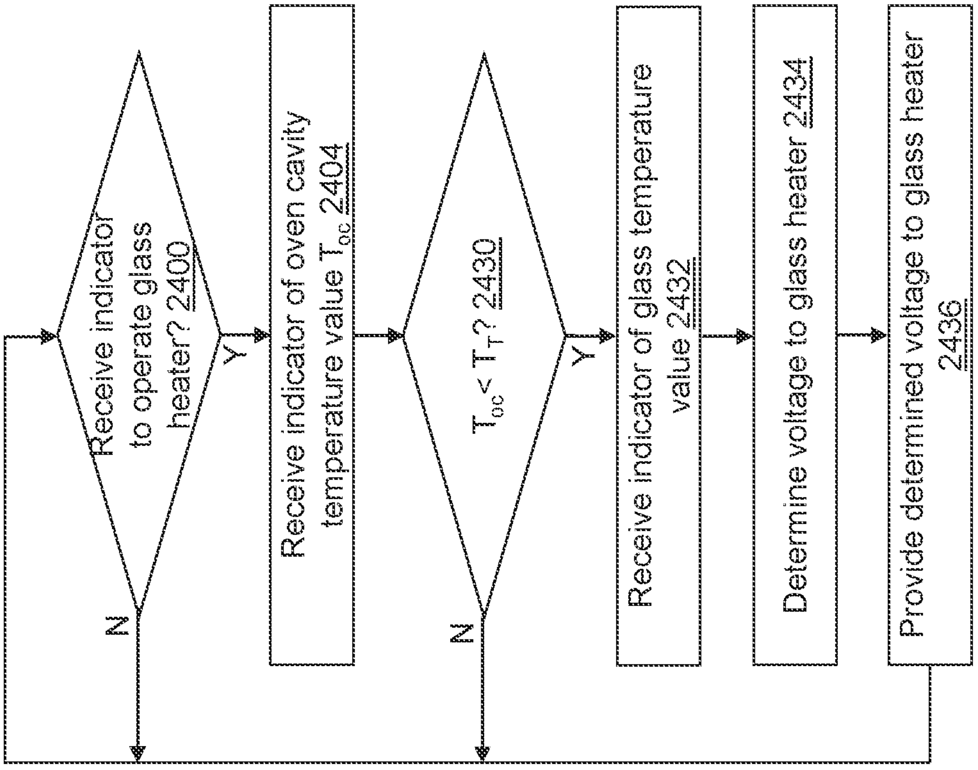

Referring to FIG. 24B, in operation 2400, the determination is made concerning whether the first indicator is received to indicate that glass heater 2324 should be operated to the on-state. When the first indicator is received, processing continues in operation 2404. When the first indicator is not received, processing continues in operation 2400 to continue to wait for receipt of the first indicator.

In operation 2404, the third indicator may be received that indicates the oven cavity temperature value $T_{oc}$.

In an operation 2430, a determination is made concerning whether the oven cavity temperature value $T_{oc}$ is less than a predefined condensation temperature value $T_T$. For example, the predefined condensation temperature value $T_T$ may be read from control data 2314 stored in non-transitory computer-readable medium 2308. Water cannot physically condense above 100 Celsius (C) assuming sea level atmospheric conditions. For illustration, the predefined condensation temperature value $T_T$ may be 100 C though a lower value may be used to offset for different altitudes, tolerances, errors, etc. When $T_{oc}<T_T$, processing continues in an operation 2432. When $T_{oc}\geq T_T$, processing continues in operation 2400.

In operation 2432, a fourth indicator may be received that indicates the glass temperature value. For example, the oven controller may receive a signal indicating a current glass temperature from door glass temperature sensor 2320. The fourth indicator may be received from the oven controller or directly based on integration between the one or more controllers of top oven 102.

In an operation 2434, a voltage is determined to provide to glass heater 2324. For example, a proportional-integral-derivative controller or other temperature regulating algorithm could be used to determine the voltage to maintain the glass at or above the predefined condensation temperature value $T_T$.

Similar to operation 2410, in an operation 2436, the voltage determined in operation 2434 is provided to glass heater 2324, and processing continues in operation 2400 of FIG. 24B.

Figure 24C:
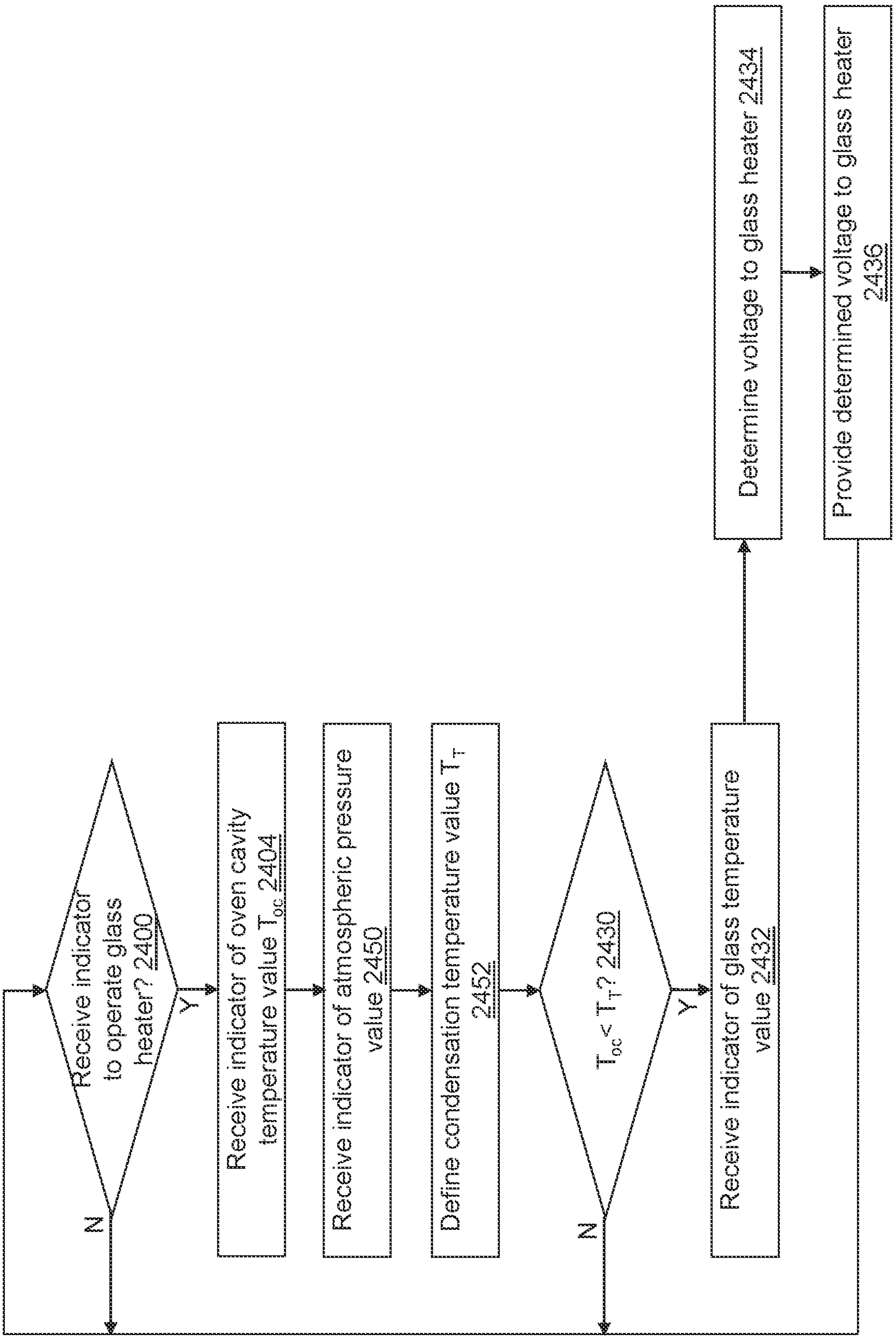

Referring to FIG. 24C, in operation 2400, the determination is made concerning whether the first indicator is received to indicate that glass heater 2324 should be operated to the on-state. When the first indicator is received, processing continues in operation 2404. When the first indicator is not received, processing continues in operation 2400 to continue to wait for receipt of the first indicator.

In operation 2404, the third indicator may be received that indicates the oven cavity temperature value $T_{oc}$.

In an operation 2450, a fifth indicator may be received that indicates a pressure value. For example, the oven controller may receive a signal indicating a current atmospheric pressure from pressure sensor 2322. The fifth indicator may be received from the oven controller or directly based on integration between the one or more controllers of top oven 102.

In an operation 2452, the condensation temperature value $T_T$ may be defined based on the indicated pressure value. For example, a predefined table may be read from control data 2314 stored in non-transitory computer-readable medium 2308. The table may define the condensation temperature value $T_T$ as a function of the indicated pressure value. In an alternative embodiment, operations 2450 and 2452 may be performed only as part of an initialization phase of top oven 102.

In operation 2430, a determination is made concerning whether the oven cavity temperature value $T_{oc}$ is less than the condensation temperature value $T_T$. When $T_{oc}<T_T$, processing continues in operation 2432. When $T_{oc}\geq T_T$, processing continues in operation 2400.

In operation 2432, the fourth indicator may be received that indicates the glass temperature value.

In operation 2434, the voltage is determined to provide to glass heater 2324.

In operation 2436, the voltage determined in operation 2434 is provided to glass heater 2324, and processing continues in operation 2400 of FIG. 24C.

Figure 24D:
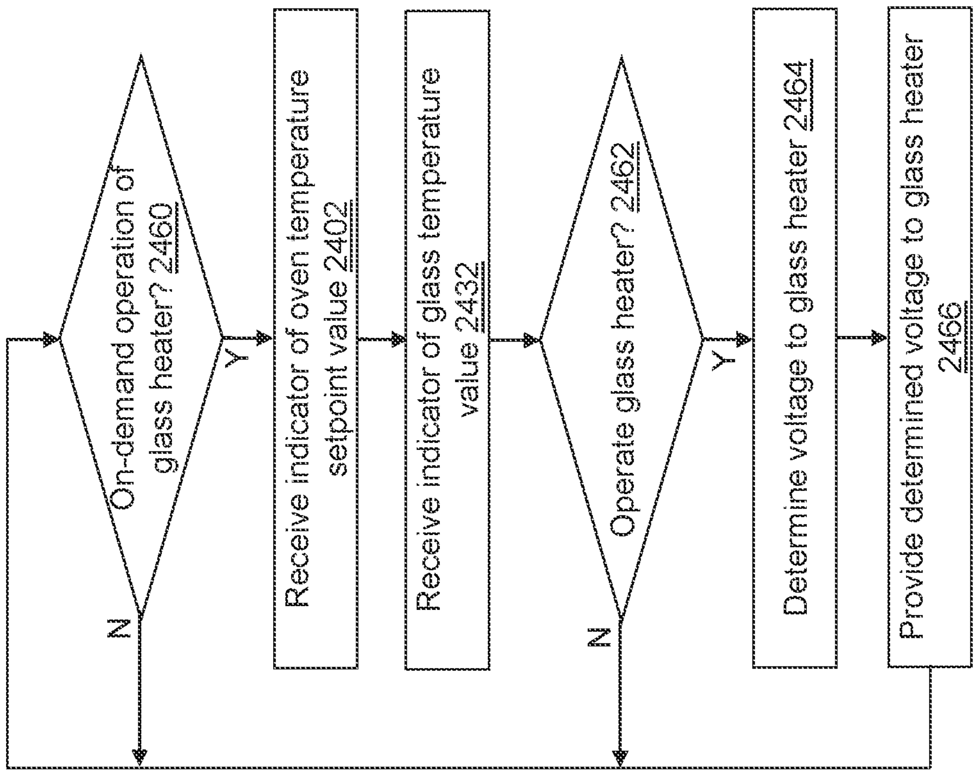

Referring to FIG. 24D, in an operation 2460, a sixth indicator is received to indicate that glass heater 2324 should be operated in an on-demand mode of operation. When the sixth indicator is received indicating the on-demand mode of operation, processing continues in operation 2402. When the sixth indicator is not received indicating the on-demand mode of operation, processing continues in operation 2460 to continue to wait for receipt of the sixth indicator. For example, the sixth indicator to indicate the on-demand mode of operation may be received when on-demand mode control 2321 is used by the user to select the on-demand mode. For example, the oven controller may receive a signal indicating selection of the on-demand mode of operation when the user selects the mode using the selector. The sixth indicator may be received from the oven controller or directly based on integration between the one or more controllers of top oven 102. On demand mode allows the user to decide when to defog cavity glass sheet 1300.

In operation 2402, the second indicator may be received that indicates the oven temperature setpoint value.

In operation 2432, the fourth indicator may be received that indicates the glass temperature value.

In an operation 2462, a determination is made whether to operate glass heater 2324. When the determination is to operate glass heater 2324, processing continues in an operation 2464. When the determination is not to operate glass heater 2324, processing continues in operation 2460 to continue to confirm whether top oven 102 remains in the on-demand mode of operation for glass heater 2324.

In operation 2464, a voltage is determined to provide to glass heater 2324 to heat the glass as quickly as possible by selecting the predefined maximum voltage value thereby minimizing the time the user waits to see through cavity glass sheet 1300.

Similar to operation 2410, in an operation 2466, the voltage determined in operation 2464 is provided to glass heater 2324, and processing continues in operation 2460.

Figure 24E:
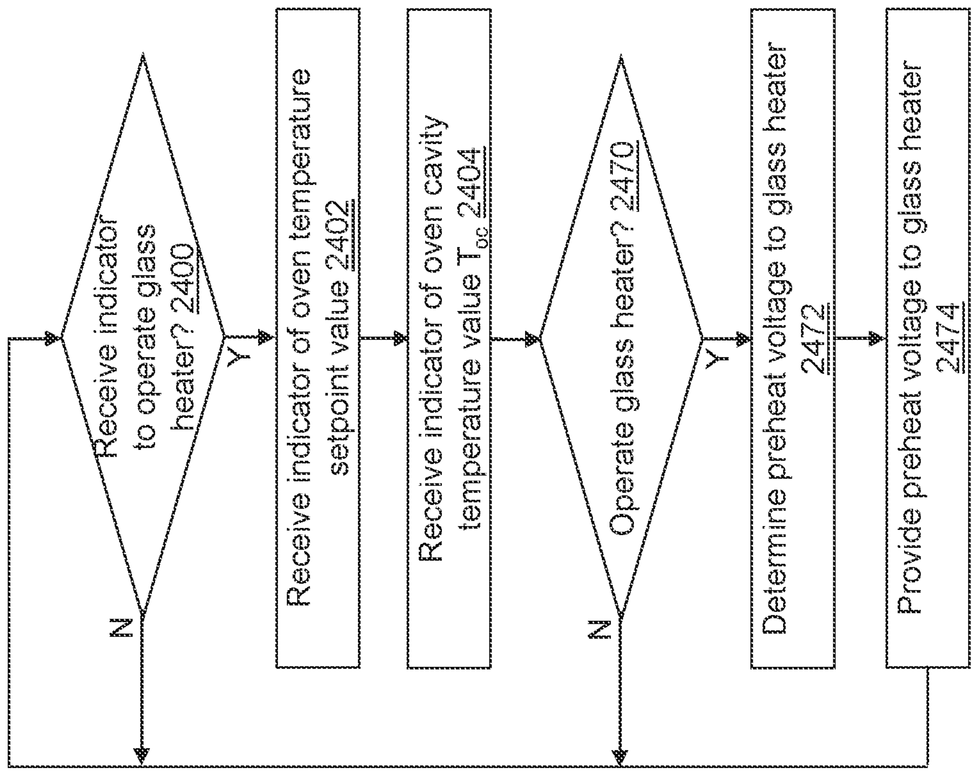

Referring to FIG. 24E, in operation 2400, the determination is made concerning whether the first indicator is received to indicate that glass heater 2324 should be operated to the on-state. When the first indicator is received, processing continues in operation 2402. When the first indicator is not received, processing continues in operation 2400 to continue to wait for receipt of the first indicator.

In operation 2402, the second indicator may be received that indicates the oven temperature setpoint value.

In operation 2404, the third indicator may be received that indicates the oven cavity temperature value $T_{oc}$.

In an operation 2470, a determination is made concerning whether the oven cavity temperature value $T_{oc}$ is equal to or greater than the oven temperature setpoint value. When the oven cavity temperature value $T_{oc}$ is not equal to or greater than the oven temperature setpoint value, processing continues in an operation 2472. When the oven cavity temperature value $T_{oc}$ is equal to or greater than the oven temperature setpoint value, processing continues in operation 2400.

In an operation 2472, a predefined voltage value is determined to provide to glass heater 2324. For illustration, the predefined voltage value may be a predefined maximum voltage value.

Similar to operation 2410, in an operation 2474, the voltage determined in operation 2472 is provided to glass heater 2324, and processing continues in operation 2400 of FIG. 24E.

If glass heater controller 2300 is operating in an open loop mode, the glass temperature value is unknown and the duration of time that glass heater 2324 operates at full power to defog as quickly as possible may be a function of how long top oven 102 has already been operating at a specific temperature due to a heat capacity of cavity glass sheet 1300. For example, the defogging function may not be enabled at a start of a cooking cycle to reduce energy consumption. At any time, the user may decide that they would like to see into top oven 102 without opening the door. If top oven 102 has been on for 10 minutes, cavity glass sheet 1300 may have reached a temperature T_glass_1. If top oven 102 has been on for 15 minutes, cavity glass sheet 1300 may have reached a temperature of T_glass_2. T_glass may not be known, but is it known that T_glass_2>T_glass_1. To reach the defogging point, glass heater 2324 can operate at full power for a shorter period of time with cavity glass sheet 1300 at T_glass_2 than T_glass_1. The specific time needed is a function of the oven temperature setpoint value, a size of the cavity of top oven 102, and the food load placed in the cavity. Empirical or simulated data can be used to characterize this function to minimize the time to defog, minimize the power consumed by glass heater 2324, and minimize undesired effects to cooking performance.

FIGS. 24A, 24B, 24C, 24D, and 24E provide illustrative operations for controlling glass heater 2324. Variations may be included while maintaining the capability to reduce or eliminate condensation on top door 120 so that the items being cooked remain visible to the user. Though voltage is referred in the illustrative embodiments of FIGS. 24A, 24B, 24C, 24D, and 24E, a temperature of cavity glass sheet 1300 may be controlled by glass heater 2324 using a voltage signal, a current signal, or a power signal.

The operations of FIGS. 24A and 24E have the benefit of not requiring door glass temperature sensor 2320 or pressure sensor 2322. As a result, fewer components are needed as well as fewer wires to connect door glass temperature sensor 2320 or pressure sensor 2322 to glass heater controller 2300 or the oven controller.

The operations of FIGS. 24B and 24C have the benefit of minimizing the energy consumption of glass heater 2324 and thereby also minimizing the heat loss to the exterior of top oven 102. The operations of FIG. 24B also have the benefit of not requiring pressure sensor 2322. The operations of FIG. 24C also have the benefit of further optimizing use of glass heater 2324 by defining a more accurate value for the condensation temperature value $T_T$.

The operations of FIG. 24D has the benefit of defogging cavity glass sheet 1300 based on a user selection of an on-demand mode of operation. Any time that cavity glass sheet 1300 fogs up, the user may determine whether or not to trigger operation of glass heater 2324 to defog cavity glass sheet 1300.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated. The orientation shown in FIG. 1 is used a reference to the remaining drawings to define an orientation for top, bottom, right, left, front, and back.

The word “illustrative” is used herein to mean serving as an example, instance, or illustration. Any aspect or design described herein as “illustrative” is not necessarily to be construed as preferred or advantageous over other aspects or designs. Further, for the purposes of this disclosure and unless otherwise specified, “a” or “an” means “one or more”. Still further, using “and” or “or” in the detailed description is intended to include “and/or” unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a processor cause the processor to:

(A) receive an indicator of an oven cavity temperature value or an oven temperature setpoint value, wherein the oven cavity temperature value indicates a current temperature in an oven cavity of an oven, wherein the oven temperature setpoint value indicates a temperature set point for the oven;

(B) determine a variable voltage value or a variable current value to be provided to operate a glass heater as a function of the indicated oven cavity temperature value or the indicated oven temperature setpoint value, wherein the glass heater is mounted to a door of the oven to heat glass mounted to the door, wherein the glass provides a view into the oven cavity;

(C) control provision of the determined voltage value or the determined current value to operate the glass heater; and (D) repeat (A) through (C) until the oven is switched to an off-state.

2. The non-transitory computer-readable medium of claim 1, wherein, in (D), (A) through (C) are repeated until the oven is switched to an off-state or the indicated oven cavity temperature value exceeds a predefined condensation temperature value.

3. The non-transitory computer-readable medium of claim 2, wherein, before (D), the computer-readable instructions further cause the processor to define the predefined condensation temperature value using an atmospheric pressure measured at the oven.

4. The non-transitory computer-readable medium of claim 3, wherein, before (B), the computer-readable instructions further cause the processor to:

receive an indicator of an atmospheric pressure value, wherein the atmospheric pressure value indicates the atmospheric pressure measured at the oven.

5. The non-transitory computer-readable medium of claim 4, wherein, before (B), the computer-readable instructions further cause the processor to:

receive an indicator of a glass temperature value, wherein the glass temperature value indicates a current glass temperature of the glass, wherein in (B), the variable voltage value or the variable current value is further determined using the indicated glass temperature value.

6. The non-transitory computer-readable medium of claim 5, wherein a proportional-integral-derivative controller is used to determine the variable voltage value or the variable current value to maintain the glass at or above the predefined condensation temperature value.

7. The non-transitory computer-readable medium of claim 2, wherein, before (B), the computer-readable instructions further cause the processor to:

receive an indicator of a glass temperature value, wherein the glass temperature value indicates a current glass temperature of the glass, wherein, in (B), the variable voltage value or the variable current value is further determined using the indicated glass temperature value.

8. The non-transitory computer-readable medium of claim 1, wherein, before (B), the computer-readable instructions further cause the processor to:

receive an indicator of a glass temperature value, wherein the glass temperature value indicates a current glass temperature of the glass, wherein, in (B), the variable voltage value or the variable current value is further determined using the indicated glass temperature value.

9. The non-transitory computer-readable medium of claim 1, wherein, in (B), the variable voltage value or the variable current value is further determined based on a cooking phase in combination with the indicated oven cavity temperature value or the indicated oven temperature setpoint value.

10. The non-transitory computer-readable medium of claim 9, wherein the cooking phase is either a preheat phase or a regulation phase, wherein the regulation phase is entered after the preheat phase completes when the oven cavity temperature value is greater than or equal to the indicated oven temperature setpoint value.

11. The non-transitory computer-readable medium of claim 1, wherein the variable voltage value is determined using a predefined table, wherein the predefined table comprises a plurality of temperature range values, wherein each temperature range value of the plurality of temperature range values includes a minimum temperature value and a maximum temperature value, wherein a glass heater voltage value is associated with each temperature range value of the plurality of temperature range values, wherein the indicated oven cavity temperature value is used to select a temperature range value from the plurality of temperature range values using the indicated oven cavity temperature value being between the minimum temperature value and the maximum temperature value of a respective temperature range value, wherein the variable voltage value is determined from the glass heater voltage value associated with the selected temperature range value.

12. The non-transitory computer-readable medium of claim 11, wherein the glass heater voltage value is a percent of a predefined maximum voltage value.

13. The non-transitory computer-readable medium of claim 1, wherein the variable voltage value is determined using a predefined equation that computes the variable voltage value using the indicated oven cavity temperature value.

14. The non-transitory computer-readable medium of claim 1, wherein the variable voltage value is determined using a predefined table, wherein the predefined table comprises a plurality of temperature range values, wherein each temperature range value of the plurality of temperature range values includes a minimum temperature value and a maximum temperature value, wherein a glass heater voltage value is associated with each temperature range value of the plurality of temperature range values, wherein the indicated oven temperature setpoint value is used to select a temperature range value from the plurality of temperature range values using the indicated oven temperature setpoint value being between the minimum temperature value and the maximum temperature value of a respective temperature range value, wherein the variable voltage value is determined from the glass heater voltage value associated with the selected temperature range value.

15. The non-transitory computer-readable medium of claim 14, wherein the glass heater voltage value is a percent of a predefined maximum voltage value.

16. The non-transitory computer-readable medium of claim 1, wherein the variable voltage value is determined using a predefined equation that computes the variable voltage value using the indicated oven temperature setpoint value.

17. The non-transitory computer-readable medium of claim 1, wherein, before (B), the computer-readable instructions further cause the processor to:

receive an indicator that an on-demand mode is selected, wherein, when the indicator that the on-demand mode is selected is received, in (B), the variable voltage value or the variable current value is determined as a predefined maximum voltage value using the indicated oven cavity temperature value or the indicated oven temperature setpoint value.

18. The non-transitory computer-readable medium of claim 17, wherein, in (D), (A) through (C) are repeated until the oven is switched to an off-state or the indicated oven cavity temperature value exceeds a predefined condensation temperature value.

19. An oven door comprising:

a wall, wherein the wall is mounted to an oven to define a moveable wall of an oven cavity, the wall comprising
  a panel frame comprising a frame wall that defines an aperture;
  a glass sheet mounted to the panel frame to cover the aperture, wherein the glass sheet provides a view into the oven cavity of the oven when the wall is in a closed position to define the oven cavity; and
  a glass heater connected to provide a voltage or a current to the glass sheet to heat the glass sheet; and
a glass heater controller comprising
  a processor; and
  a non-transitory computer-readable medium operably coupled to the processor, the computer-readable medium having computer-readable instructions stored thereon that, when executed by the processor, cause the glass heater controller to
    (A) receive an indicator of an oven cavity temperature value or an oven temperature setpoint value, wherein the oven cavity temperature value indicates a current temperature in the oven cavity of the oven, wherein the oven temperature setpoint value indicates a temperature set point for the oven;
    (B) determine a variable voltage value or a variable current value to be provided to operate the glass heater as a function of the indicated oven cavity temperature value or the indicated oven temperature setpoint value;
    (C) control provision of the determined voltage value or the determined current value to operate the glass heater; and
    (D) repeat (A) through (C) until the oven is switched to an off-state.

20. An oven comprising:

a plurality of walls that form an oven cavity;
a moveable wall, wherein the moveable wall is mounted to at least one wall of the plurality of walls, the moveable wall comprising
  a panel frame comprising a frame wall that defines an aperture;
  a glass sheet mounted to the panel frame to cover the aperture, wherein the glass sheet provides a view into the oven cavity when the moveable wall is in a closed position to define the oven cavity; and
  a glass heater connected to provide a voltage or a current to the glass sheet to heat the glass sheet; and
a glass heater controller comprising
  a processor; and
  a non-transitory computer-readable medium operably coupled to the processor, the computer-readable medium having computer-readable instructions stored thereon that, when executed by the processor, cause the glass heater controller to
    (A) receive an indicator of an oven cavity temperature value or an oven temperature setpoint value, wherein the oven cavity temperature value indicates a current temperature in the oven cavity of the oven, wherein the oven temperature setpoint value indicates a temperature set point for the oven;
    (B) determine a variable voltage value or a variable current value to be provided to operate the glass heater as a function of the indicated oven cavity temperature value or the indicated oven temperature setpoint value;
    (C) control provision of the determined voltage value or the determined current value to operate the glass heater; and
    (D) repeat (A) through (C) until the oven is switched to an off-state.

* * * * *